United States Patent
Power et al.

(10) Patent No.: US 11,449,345 B2
(45) Date of Patent: Sep. 20, 2022

(54) METHODS, SYSTEMS AND APPARATUS FOR ADJUSTING A DATA PATH ELEMENT OF A NEURAL NETWORK ACCELERATOR FROM CONVOLUTION MODE TO POOLING MODE

(71) Applicant: Movidius LTD., Dublin (IE)

(72) Inventors: Sean Power, Dublin (IE); David Moloney, Dublin (IE); Brendan Barry, Dublin (IE); Fergal Connor, Dundalk (IE)

(73) Assignee: MOVIDIUS LIMITED, Schiphol-Rijk (NL)

( * ) Notice: Subject to any disclaimer, the term of this patent is extended or adjusted under 35 U.S.C. 154(b) by 0 days.

(21) Appl. No.: 16/687,377

(22) Filed: Nov. 18, 2019

(65) Prior Publication Data

US 2020/0089506 A1     Mar. 19, 2020

Related U.S. Application Data

(63) Continuation of application No. PCT/EP2018/063231, filed on May 18, 2018.
(Continued)

(51) Int. Cl.
*G06F 9/38* (2018.01)
*G06N 3/063* (2006.01)

(52) U.S. Cl.
CPC ........... *G06F 9/3897* (2013.01); *G06N 3/063* (2013.01)

(58) Field of Classification Search
CPC ......... G06F 9/3897; G06N 3/06; G06N 3/063
See application file for complete search history.

(56) References Cited

U.S. PATENT DOCUMENTS 4,432,481 A * 2/1984 Miller ................ B65H 19/1873
                                                             226/9
9,697,463 B2    7/2017 Ross et al.
(Continued)

FOREIGN PATENT DOCUMENTS

CN       111133452      5/2020
DE     112018002566     1/2020
(Continued)

OTHER PUBLICATIONS

Japanese Patent Office, "Notice of Reason(s) for Rejection," issued in connection with Japanese Patent Application No. 2020-514345, dated Apr. 6, 2021 (8 pages).
(Continued)

*Primary Examiner* — David J. Huisman
(74) *Attorney, Agent, or Firm* — Hanley, Flight & Zimmerman, LLC

(57) ABSTRACT

Methods, apparatus, systems, and articles of manufacture are disclosed to improve convolution efficiency of a convolution neural network (CNN) accelerator. An example hardware accelerator includes a hardware data path element (DPE) in a DPE array, the hardware DPE including an accumulator, and a multiplier coupled to the accumulator, the multiplier to multiply first inputs including an activation value and a filter coefficient value to generate a first convolution output when the hardware DPE is in a convolution mode, and a controller coupled to the DPE array, the controller to adjust the hardware DPE from the convolution mode to a pooling mode by causing at least one of the multiplier or the accumulator to generate a second convolution output based on second inputs, the second inputs including an output location value of a pool area, at least one of the first inputs different from at least one of the second inputs.

14 Claims, 19 Drawing Sheets

Related U.S. Application Data

(60) Provisional application No. 62/508,896, filed on May 19, 2017.

(56) References Cited

U.S. PATENT DOCUMENTS

| | | | |
|---|---|---|---|
| 2015/0170021 A1* | 6/2015 | Lupon | G06N 3/0454 706/15 |
| 2017/0103298 A1* | 4/2017 | Ling | G06N 3/0454 |
| 2017/0103299 A1 | 4/2017 | Aydonat et al. | |
| 2018/0253635 A1* | 9/2018 | Park | G06F 7/535 |
| 2020/0026515 A1* | 1/2020 | Valentine | G06F 9/3818 |

FOREIGN PATENT DOCUMENTS

| | | |
|---|---|---|
| EP | 3153996 | 4/2017 |
| JP | 2015210709 | 11/2015 |
| WO | 2018211129 | 11/2018 |

OTHER PUBLICATIONS

Ryo Takada, "Design and evaluation of scalable accelerator chips for deep learning," IEICE (Institute of Electronics, Information and Communication Engineers) Technical Report, with English Translation, Japan, IEICE, Nov. 21, 2016, vol. 116, No. 336, pp. 1-6 (15 pages).

International Searching Authority, "Search Report," issued in connection with PCT patent application No. PCT/EP2018/063231 dated Sep. 14, 2018, 4 pages.

International Searching Authority, "Written Opinion," issued in connection with PCT patent application No. PCT/EP2018/063231 dated Sep. 14, 2018, 5 pages.

Lu Wenyan et al., "FlexFlow: A Flexible Dataflow Accelerator Architecture for Convolutional Neural Networks", 2017 IEEE International Symposium On High Performance Computer Architecture (HPCA), IEEE,Feb. 4, 2017 (Feb. 4, 2017), p. 553-564, 12 pages.

Zhang Chen et al., "Caffeine: Towards Uniformed Representation and Acceleration for Deep Convolutional Neural Networks", 2016 IEEE/ACM International Conference On Computer-Aided Design (ICCAD), ACM,Nov. 7, 2016 (Nov. 7, 2016), p. 1-8, 8 pages.

Mingcong Song et al., "Bridging the Semantic Gaps of GPU Acceleration for Scale-out CNN-based Big Data Processing: Think Big, See Small", Parallel Architectures and Compilation, ACM, 2 Penn Plaza, Suite 701 New York NY 10121-0701 USA,Sep. 11, 2016 (Sep. 11, 2016), p. 315-326, 12 pages.

Kaiyuan Guo, Shulin Zeng, Jincheng Yu, Yu Wang and Huazhong Yang. 2017. "[DL] A Survey of FPGA-Based Neural Network Inference Accelerator." ACM Transactions on Reconfigurable Technology and Systems, vol. 9, No. 4, Miele 11 (Dec. 2017), 26 pages.

Japanese Patent Office, "Decision to Refuse," issued in connection with Japanese Patent Application No. 2020-514345, dated Sep. 15, 2021 (6 pages).

\* cited by examiner

| ADDRESS SEQUENCE | INPUT CHANNEL | DATA [127:0] | COEFFICIENT |
|---|---|---|---|
| BASE ADDRESS | 0 | CH7.... CH0<br>CH7.... CH0<br>.<br>.<br>CH7..............CH0 | [0,0]<br>[0,1]<br><br><br>[Fw,Fh] |
| BASE ADDRESS + CH STR IN | 1<br>C-1<br><br><br><br>C-1 | CH7.... CH0<br>.<br>CH7.... CH0<br>CH7.... CH0<br>.<br>CH7..............CH0 | [0,0]<br><br>[0,0]<br>[0,1]<br><br>[Fw,Fh] |
| BASE ADDRESS + CH STR OUT | 0 | CH15.... CH8<br>CH15.... CH8<br>.<br>. | [0,0]<br>[0,1] |

FIG. 8

| ADDRESS SEQUENCE | INPUT CHANNEL | DATA [127:0] | | COEFFICIENT |
|---|---|---|---|---|
| BASE ADDRESS | 0 – CH_PER_RAM | CH7..... | CH0 | CH0 [1,0],[0,2],[0,1],[0,0] |
| | | CH7..... | CH0 | CH0 [2,1],[2,0],[1,2],[1,1] |
| | | CH7..... | CH0 | CH1 [0,2],[0,1],[0,0] CH0 [2,2] |
| | | CH7..... | CH0 | CH1 [2,0],[1,2],[1,1],[1,0] |
| | | | | . . |
| BASE ADDRESS + (CH STR IN*CH_PER_RAM) [NEXT RAM BLOCK OF COEFFs] | CH_PER_RAM+1.... | CH7..... | CH0 | CH N [1,0],[0,2],[0,1],[0,0] |
| | | . | . | ETC. |

METHODS, SYSTEMS AND APPARATUS FOR ADJUSTING A DATA PATH ELEMENT OF A NEURAL NETWORK ACCELERATOR FROM CONVOLUTION MODE TO POOLING MODE

RELATED APPLICATION

This patent arises from a continuation of PCT Application Number PCT/EP2018/063231, which was filed on May 18, 2018, which claims the benefit of U.S. Provisional Patent Application Ser. No. 62/508,896, which was filed on May 19, 2017. PCT Application Number PCT/EP2018/063231 and U.S. Provisional Patent Application Ser. No. 62/508,896 are hereby incorporated herein by reference in their entireties. Priority to PCT Application Number PCT/EP2018/063231 and U.S. Provisional Patent Application Ser. No. 62/508,896 are hereby claimed.

FIELD OF THE DISCLOSURE

This disclosure relates generally to image processing and, more particularly methods, systems and apparatus to improve convolution efficiency.

BACKGROUND

In recent years, a demand for image processing capabilities has moved beyond high-power dedicated desktop hardware and has become an expectation for personal and/or otherwise mobile devices. Mobile devices typically include processing capabilities that are limited by size constraints, temperature management constraints, and/or supply power constraints.

BRIEF DESCRIPTION OF THE DRAWINGS

FIG. 8 is an example table depicting an example addressing model for an example coefficient store.

FIG. 9 is an example table depicting an example addressing model for an example coefficient store based on non-FP16 formats.

The figures are not to scale. In general, the same reference numbers will be used throughout the drawing(s) and accompanying written description to refer to the same or like parts.

DETAILED DESCRIPTION

Figure 1:
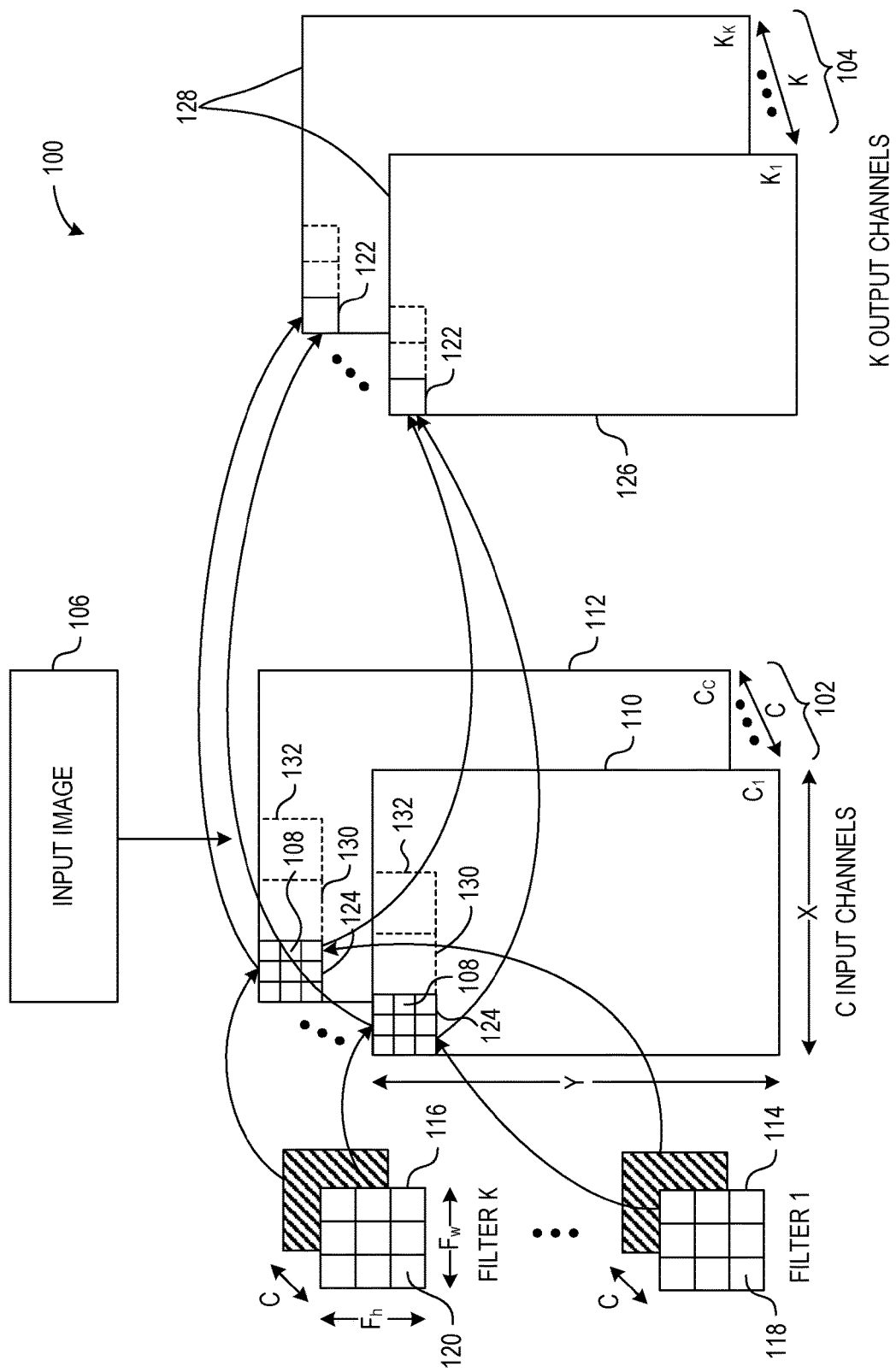
FIG. 1 illustrates an example convolution operation of an example input volume and an example output volume using convolution.

Typical computing systems, including personal and/or otherwise mobile devices, employ advanced image processing or computer vision algorithms to automate tasks that human visual systems can perform Computer vision tasks include acquiring, processing, analyzing, and understanding digital images, which facilitates, in part, extraction of dimensional data from the digital images to produce numerical and/or symbolic information. Computer vision algorithms can use the numerical and/or symbolic information to make decisions and/or otherwise perform operations associated with three-dimensional (3-D) pose estimation, event detection, object recognition, video tracking, etc., among others.

Advanced image processing or computer vision algorithms can employ a convolutional neural network (CNN, or ConvNet). A CNN is a deep, artificial neural network typically used to classify images, cluster the images by similarity (e.g., a photo search), and perform object recognition within the images using convolution. As used herein, convolution refers to a function derived from two given functions by integration that expresses how a shape of one of the functions is modified by a shape of the other function. For example, a CNN can be used to identify faces, individuals, street signs, animals, etc., included in an input image by passing over one or more filters corresponding to an image feature (e.g., a horizontal line, a two-dimensional (2-D) shape, etc.) over the input image to identify matches of the image feature within the input image.

In some examples, CNNs ingest and/or otherwise process images as tensors, which are matrices of numbers with additional dimensions. For example, a CNN can obtain an input image represented by 3-D tensors, where a first and a second dimension correspond to a width and a height of a matrix and a third dimension corresponds to a depth of the matrix. For example, the width and the height of the matrix can correspond to a width and a height of an input image and the depth of the matrix can correspond to a color depth (e.g., a color layer) or a color encoding of the image (e.g., a Red-Green-Blue (RGB) encoding).

Compared to neural networks, CNNs scale well to full images. For example, a typical neural network receives an input (e.g., a single vector) and transforms the input through a series of hidden layers, where each hidden layer includes a set of neurons, where each neuron is fully connected to all neurons in the previous layer, and where neurons in a single layer function completely independently and do not share any connections. In such examples, the typical neural network can translate an image of 200×200×3 (e.g., 200 pixels× 200 pixels×3 color depths) to 120,000 weights, where each weight can have more than one neuron. For example, the image can have three input channels corresponding to each color depth, where each input channel has a dimension of 200 pixels×200 pixels.

A typical CNN can also receive an input and transform the input through a series of hidden layers. For example, a CNN can have a plurality of convolution layers, pooling layers, and/or fully-connected layers. In such examples, a CNN can have a plurality of layer triplets including a convolution layer, a pooling layer, and a fully-connected layer. In some examples, a CNN has a plurality of convolution and pooling layer pairs that output to one or more fully-connected layers. In some examples, a CNN can include 20 layers, 30 layers, etc.

A convolution layer applies a convolution function or operation to map images of an input (previous) layer to the next layer in a CNN. The convolution is 3-D because each input layer can have multiple input features (e.g., input channels) associated with an input image. The convolution layer performs convolution by forming a regional filter window in each individual input channel and generating output data or activations by calculating a product of (1) a filter weight associated with the regional filter window and (2) the input data covered by the regional filter window. For example, an output feature of an input image can be determined by using the convolution filter to scan a plurality of input channels including a plurality of the regional filter windows.

A pooling layer extracts information from a set of activations in each output channel. The pooling layer can perform a maximum pooling operation corresponding to a maximum pooling layer or an average pooling operation corresponding to an average pooling layer. The maximum pooling operation includes selecting a maximum value of activations within a pooling window. The average pooling operation includes calculating an average value of the activations within the pooling window.

A fully-connected layer obtains the data calculated by the convolution layer(s) and/or the pooling layer(s) and classifies the data into one or more classes. The fully-connected layer determines whether the classified data corresponds to a particular image feature of the input image. For example, the fully-connected layer can determine whether the classified data corresponds to a simple image feature (e.g., a horizontal line) or a more complex image feature like an animal (e.g., a cat).

In some instances, a CNN performs a post-processing operation such as a Parametric Rectified Linear Unit (PReLU) operation or a Rectified Linear Unit (ReLU) operation that is initiated after a convolution layer, a pooling layer, etc. A PReLU operation and a ReLU operation correspond to activation functions applied to outputs of the CNN neurons. For example, after a CNN generates an output from a convolution layer, a pooling layer, etc., the PReLU operation or the ReLU operation can include applying an elementwise activation function on the activation. For example, a PReLU operation can include multiplying and/or otherwise scaling the activation by a first PReLU parameter when the output is less than a PReLU base parameter. In other instances, the PReLU operation can include multiplying and/or otherwise scaling the activation by a second PReLU parameter when the activation is greater than the PReLU base parameter. A ReLU operation can include applying a maximum function to the activation where the ReLU operation returns a maximum value between zero and the activation. In such instances, the ReLU operation can include setting any negative elements to zero and, thus, speeds up training of the CNN by eliminating and/or otherwise avoiding additional exponential, multiplication, or division operations on the activation.

However, the hidden layers of the CNN can have neurons arranged in three dimensions including width, height, and depth. Each of the neurons in a layer of the CNN are only connected to a portion (e.g., a relatively small region (e.g., a 2×2 activation map, a 3×3 activation map, etc.)) of the layer before it. Compared to a typical neural network, in which all neurons of a layer are connected to all neurons of a preceding layer, neurons of a CNN layer result in substantially fewer weights due to the substantially fewer number of connections between layers.

Examples disclosed herein improve an efficiency of CNN operations. An example CNN accelerator disclosed herein implements multichannel CNN matrix-matrix convolutions with optional non-overlapping maximum and average pooling at any layer, including Fully Connected, with optional PReLU/ReLU/ReLU-X and per-activation scaling and bias. Compared to prior implementations that performed individual convolution operations sequentially, example CNN accelerators disclosed herein perform a plurality of convolution operations substantially in parallel. Additionally, the example CNN accelerator can implement overlapping pooling (e.g., maximum pooling, average pooling, etc.) operations.

FIG. 1 illustrates an example convolution operation 100 of an example input volume 102 and an example output volume 104 using convolution. The example input volume 102 of FIG. 1 corresponds to an example input image (e.g., a photograph, a video frame, etc.) 106 represented by pixel values stored in multidimensional matrices. For example, the input image 106 can be retrieved from a device such as a camera or from memory (e.g., non-volatile memory, volatile memory, etc.). The example input volume 102 includes a set of example input channels ($C_1$, $C_C$, etc.) 110, 112 representative of a multidimensional matrix. The example input volume 102 is represented by X×Y×C, where X and Y are dimensions of each of the example input channels 110, 112 in example pixels 108 and C represents a number of input channels or a depth of the input volume 102. Each of the example pixels 108 are represented by a number. For example, the number can correspond to an intensity of a color (e.g., an intensity of Red, Green, or Blue) of the pixel 108.

In the illustrated example of FIG. 1, the input volume 102 includes a plurality of multidimensional matrices including the first channel 110 with dimensions X and Y and the C channel 112 with dimensions X and Y. In some examples, the quantity of input channels C corresponds to a color encoding of the input image (e.g., a Red-Green-Blue (RGB) encoding). For example, the input volume 102 can correspond to the input image 106 with a size of 200×200×3, where the input image 106 is 200 pixels high (e.g., Y=200), 200 pixels wide (e.g., X=200), and has 3 encoded colors (e.g., C=3).

In the illustrated example of FIG. 1, the output volume 104 is generated by convolving the input volume 102 using example filters, such as a first example filter (FILTER 1) 114 and a second example filter (FILTER K) 116. The example filters 114, 116 of FIG. 1 correspond to image features. For example, an image feature can be a horizontal line, a vertical line, a diagonal line, etc., that can be included in the input image 106. Alternatively, the example filters 114, 116 are referred to as feature detectors or kernels. In the illustrated example of FIG. 1, the filters 114, 116 are multidimensional matrices of dimensions Fw, Fh, C, where Fw represents a width of the filters 114, 116 in coefficients or weights (e.g., first coefficients 118 associated with the first filter 114, second coefficients 120 associated with the second filter 116, etc.), Fh represents a height of the filters 114, 116 in coefficients 118, 120, and C represents a depth of the filters 114, 116. In the illustrated example of FIG. 1, the depth of the input volume 102 matches the depth of the filters 114, 116. For example, the quantity of filter channels is equal to the quantity of the input channels represented by C. The example coefficients 118, 120 represent learnable values that can be adjusted to identify image features included in the example input image 106.

In the illustrated example of FIG. 1, respective channels (e.g., $C_1$, $C_2$, $C_C$, etc.) of the filters 114, 116 is a 3×3 matrix including nine example coefficients 118, 120. Alternatively, the channels of the example filters 114, 116 may be a different matrix size including a different number of coefficients. In the illustrated example of FIG. 1, the first filter (FILTER 1) 114 includes the first coefficients 118 and the second filter (FILTER K) 116 includes the second coefficients 120, where the first coefficients 118 are different from the second coefficients 120. Alternatively, one or more of the first example coefficients 118 and one or more of the second example coefficients 120 may be the same. In the illustrated example of FIG. 1, the filters 114, 116 include different coefficients for each channel. In the illustrated example of FIG. 1, the convolution operation 100 uses K filters 114, 116. For example, the convolution operation 100 can use 50 filters (e.g., K=50), 100 filters (e.g., K=100), etc.

In operation, example output locations 122 are generated by performing a dot product of example input channel portions 124 and the example filters 114, 116. In a typical CNN, output locations such as the example output locations 122 can also be referred to as activations. For example, the convolution operation 100 can include calculating a first dot product of a first filter channel of the first filter 114 and the input channel portion 124 of the first input channel 110. The example convolution operation 100 can include calculating a second dot product of a second filter channel of the first example filter 114 and the example input channel portion 124 of the second example input channel 112. Additional dot products are calculated until a dot product has been calculated for each of the input channels 124.

In the illustrated example of FIG. 1, C dot products are calculated for each of the output locations 122 based on the filters 114, 116 each having a depth of C. In such examples, the output location 122 of a first example output channel ($K_1$) 126 of example output channels 128 is calculated by determining a sum of the first dot product, the second dot product, etc., up to C dot products. In a typical CNN, output channels such as the first example output channel 126 can also be referred to as an activation map, a feature map, or a convolved feature.

In response to calculating the example output location 122 of the first example output channel 126, dot products are calculated for a second example input channel portion 130, a third example input channel portion 132, etc., until an entirety of the first example input channel 110 is processed. In response to processing an entirety of the first example input channel 110, the example convolution operation 100 proceeds to perform the above-described operation for each of the remaining input channels (e.g., $C_2$, $C_3$, etc., up to $C_C$) to generate corresponding ones of the example output channels 128.

In the illustrated example of FIG. 1, the convolution operation 100 accesses the input channel portions 124 only once. If the first example output channel 122 is considered, then only the input data and associated filtering needs to be read, and can be repeated for all subsequent output channels 128, but with corresponding different filters. By performing the example convolution operation 100 in parallel, rather than sequentially, an amount of needed data is reduced. Multiple channels of input data are convolved with the appropriate example filters 114, 116 to generate the example output locations 122 for a plurality of the example output channels 128 in parallel, which, in some examples, are each optionally pooled.

Figure 2:
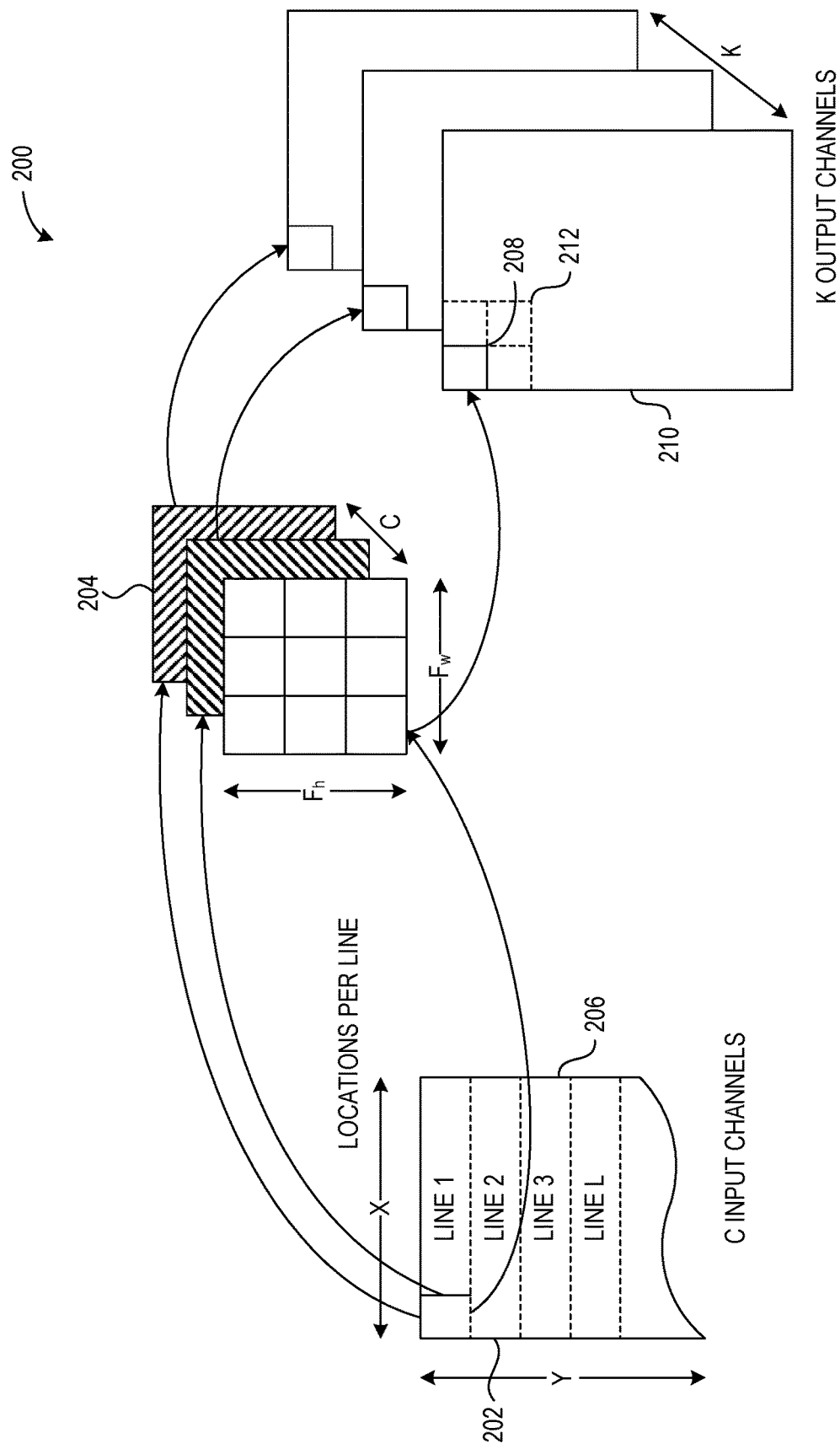
FIG. 2 illustrates an example multichannel convolution operation on a "per-output-location" basis.

FIG. 2 illustrates an example multichannel convolution operation 200 on a "per-output-location" basis. For example, the multichannel convolution operation 200 can be performed on a per-activation basis. The example multichannel convolution operation 200 of FIG. 2 represents an example convolution layer of an example CNN (e.g., a CNN accelerator, a CNN hardware accelerator, etc.). For example, the multichannel convolution operation 200 can provide activations to a pooling layer, which, in turn, can provide activations to a fully-connected layer (e.g., a non-linear layer) or another convolution layer. In such examples, the fully-connected layer can provide activations to another layer triplet including another convolution, pooling, and fully-connected layer.

In the illustrated example of FIG. 2, example input data 202 with dimensions X in columns or words (e.g., 16-bit words) and Y in lines is convolved using a plurality of example filters 204 of dimensions Fw and Fh, where Fw and Fh are both three (3). For example, the input data 202 can be obtained from the input image 106 of FIG. 1 and/or from memory. In the illustrated example of FIG. 2, the input data 202 includes L example lines 206 of data stored locally for a plurality of input channels to be convolved. In the illustrated example of FIG. 2, a portion of the lines 206 are stored for each input channel. In some examples, the lines 206 include all of the data for an input channel while, in other examples, the lines 206 include a portion of the data for the input channel.

In the illustrated example of FIG. 2, the multichannel convolution operation 200 includes generating each of the example output locations 208 of example output channels 210 substantially in parallel. For example, a first one of the data lines 206 is convolved using a first one of the filters 204 to generate a first one of the output locations 208 included in a first one of the output channels 210 substantially in parallel with the first one of the data lines 206 being convolved using a second one of the filters 204 to generate a second one of the output locations 208 included in a second one of the output channels 210.

In the illustrated example of FIG. 2, each of the output channels 210 has and/or is otherwise associated with its own accumulator (e.g., an accumulator implemented in hardware and/or machine readable instructions). In some examples, maximum pooling or average pooling is implemented on the output channels 210 by carrying out a compare operation, a store operation, and an accumulate operation on each element in an example pool area 212 and only outputs the resultant.

In the illustrated example of FIG. 2, the pool area 212 is a 2×2 area of the output locations 208. Alternatively, the example pool area 212 may be any other size. For example, a pooling operation can include taking a maximum value, an average value, etc., of the values included in the pool area 212 and outputting the resulting maximum value, the average value, etc. In some examples, the pooling operation includes overlapping. In other examples, the pooling operation does not include overlapping. For example, the pool area 212 cannot overlap another pool area as each location must be read once only when the pooling operation does not include overlapping.

Figure 3:
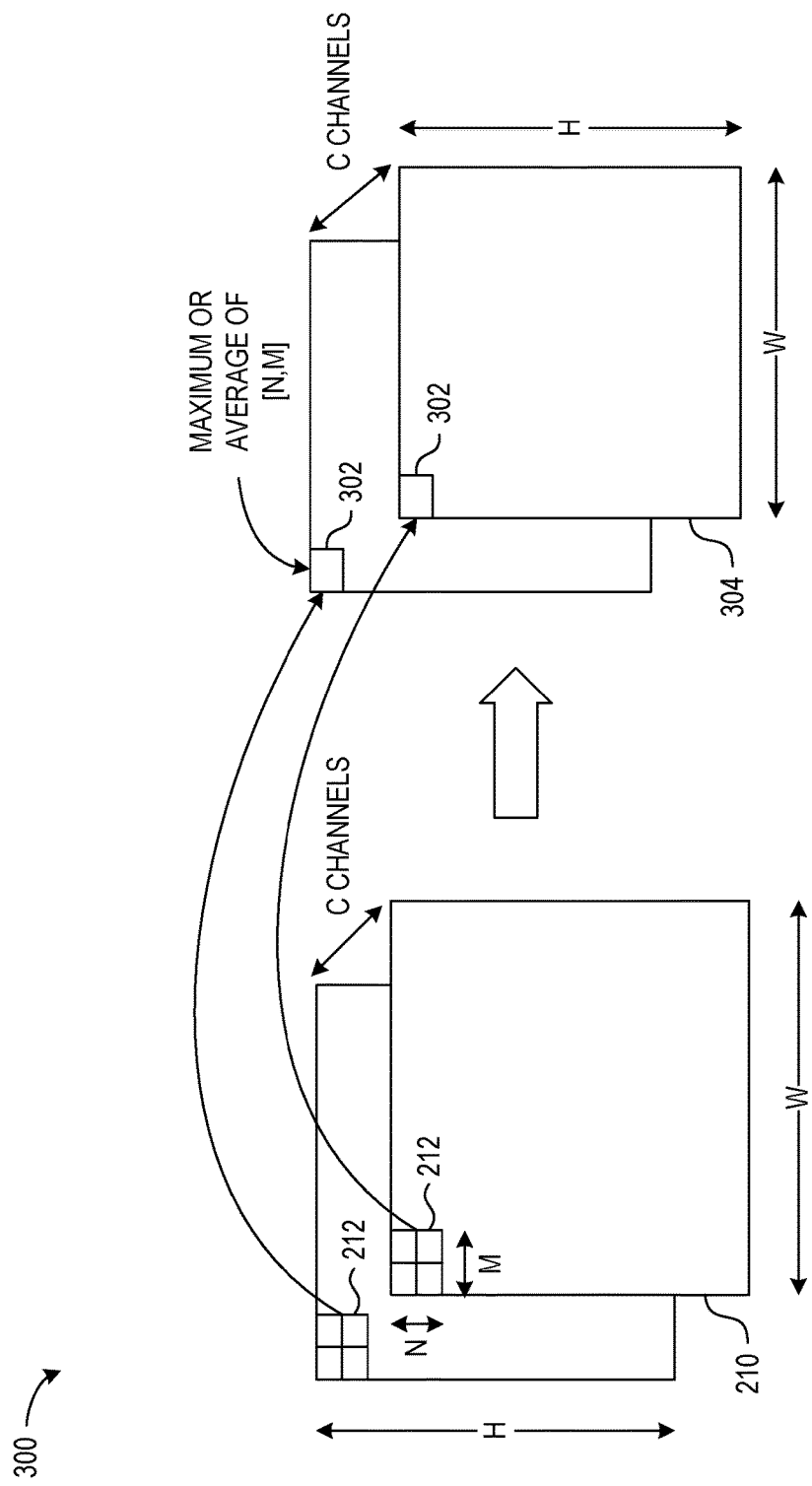
FIG. 3 illustrates a schematic representation of an example pooling operation.

FIG. 3 illustrates a schematic representation of an example pooling operation 300. The example pooling operation 300 of FIG. 3 represents a pooling layer of an example CNN. For example, the pooling operation 300 can provide outputs to a fully-connected layer of the CNN or another convolution layer of the CNN. In the illustrated example of FIG. 3, the pooling operation 300 includes processing the output channels 210 from the multichannel convolution operation 200 of FIG. 2. In the illustrated example of FIG. 3, the output channels 210 have dimensions H, W, and C corresponding to a height, width, and depth of the output channels 210, respectively.

In the illustrated example of FIG. 3, the pooling operation 300 processes the pool area 212 of FIG. 2 by calculating a maximum value (e.g., maximum pooling) or an average value (e.g., average pooling) of the pool area 212 and outputting the maximum value or the average value at respective ones of example output locations 302 of respective ones of example pooled output channels 304. In the illustrated example of FIG. 3, the pooled output channels 304 have dimensions H, W, and C to match the output channels 210 of FIG. 2.

The example pooling operation 300 of FIG. 3 processes (e.g., iteratively processes) a plurality of the pool areas 212 based on a stride (e.g., a stride length) of the pooling operation 300. In the illustrated example of FIG. 3, the stride length is one corresponding to the pool area 212 being adjacently moved (e.g., being moved to the right side of the output channels 210) by one index, column, etc. In the illustrated example of FIG. 3, the pooling operation 300 is an overlapping pooling operation. For example, the pool area 212 depicted in FIG. 3 is at a first position. After first ones of the output locations 302 are calculated, the pool area 212 is moved to a second position, where the second position is one index or one column to the right side of the first position when the stride length is one. In such examples, the second column of the pool area 212 in the first position overlaps the first column of the pool area 212 in the second position. The example pooling operation 300 calculates the maximum value or the average value of the pool area 212 over an entirety of the output channels 210.

Figure 4:
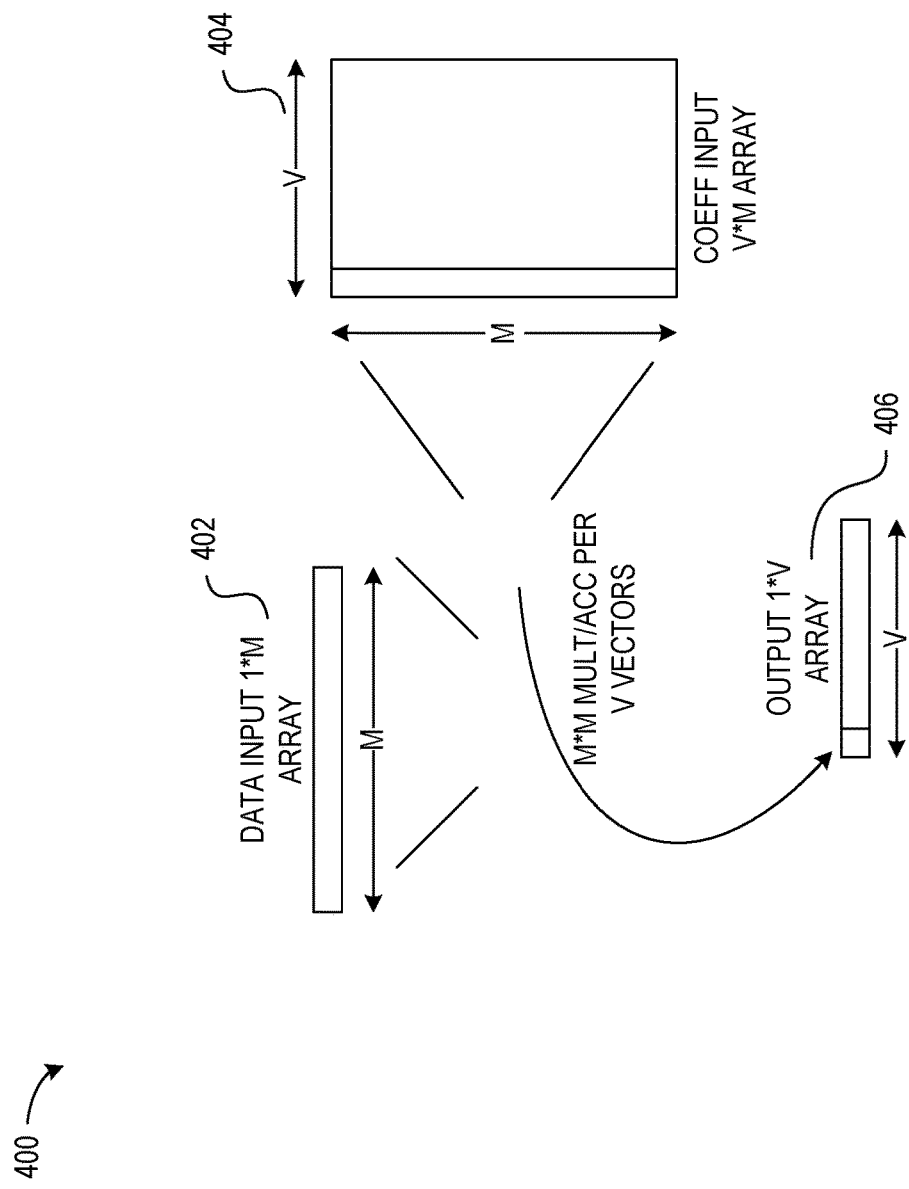
FIG. 4 illustrates a schematic representation of an example fully-connected operation.

FIG. 4 illustrates a schematic representation of an example fully-connected operation 400. The example fully-connected operation 400 of FIG. 4 is a fully-connected layer of an example CNN. For example, the fully-connected operation 400 can provide outputs to another CNN triplet layer including another convolution, pooling, and fully-connected layer. In a CNN, the fully-connected layer has full connections to all activations in the previous layer. The fully-connected layer is similar to channel convolution to perform a vector matrix multiply.

In the illustrated example of FIG. 4, a data input 402 is shown as a 1×M array, and a coefficient or weights array 404 of V×M. A corresponding example output array 406 is of size 1×V. Each column (of size M) is multiplied by each element to obtain a sum, and this is performed V times. In some examples, the CNN evaluates the output array 406 to determine a percent likelihood that an image feature is included in the input image 106 of FIG. 1. For example, the CNN can determine a percent likelihood for a plurality of simple image features such as a horizontal line, a diagonal line, etc., are included in the input image 106. In other examples, the CNN can determine a percent likelihood for a plurality of complex image features such as a cat, a dog, an elephant, etc., are included in the input image 106.

Figure 5:
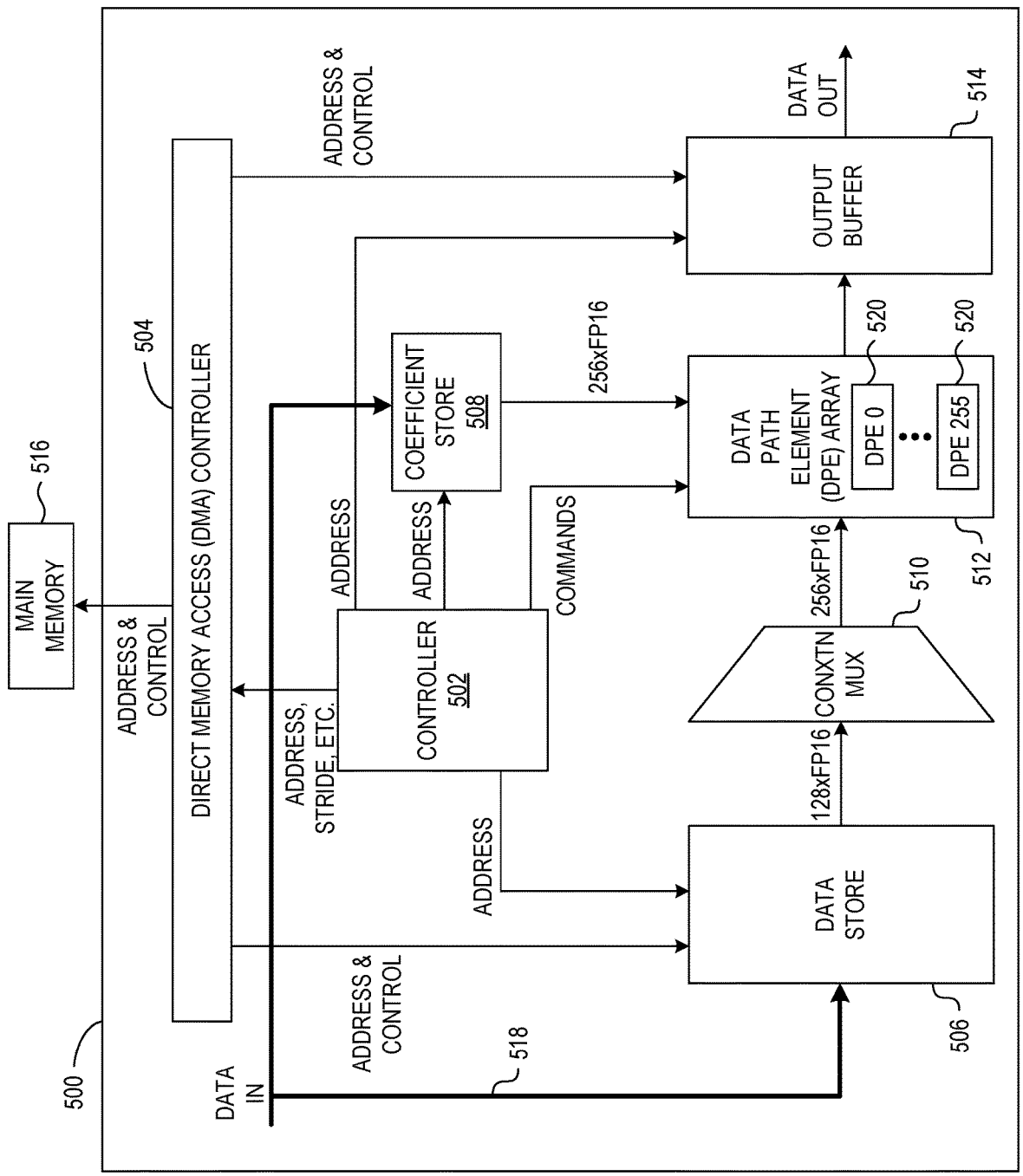
FIG. 5 illustrates a block diagram of an example convolution neural network (CNN) accelerator.

FIG. 5 illustrates a block diagram of an example CNN accelerator 500. In the illustrated example of FIG. 5, the CNN accelerator 500 is a platform (e.g., a hardware platform) or a hardware accelerator used to accelerate image classification algorithms and/or other types of processes in image and video recognition, recommender systems, and natural language processing. Additionally or alternatively, the CNN accelerator 500 could be implemented by software executing on a hardware processor. The example CNN accelerator 500 implements at least one of the example convolution operation 100 of FIG. 1, the example multichannel convolution operation 200 of FIG. 2, the example pooling operation 300 of FIG. 3, or the fully-connected operation 400 of FIG. 4. In the illustrated example of FIG. 5, the CNN accelerator 500 includes an example controller 502, an example direct memory access (DMA) controller 504, an example data store 506, an example coefficient store 508, an example connection multiplexer (CONXTN MUX) 510, an example data path element (DPE) array 512, and an example output buffer 514.

In the illustrated example of FIG. 5, the CNN accelerator 500 includes the controller 502 to determine a mode of operation and an operation sequence of the CNN accelerator 500. For example, the controller 502 can instruct the CNN accelerator 500 to operate in a convolution mode (with optional pooling), a pooling mode (e.g., an overlapping pooling mode), or a fully-connected mode (e.g., a non-linear mode). In some examples, the controller 502 determines whether to perform a post-process operation (e.g., a PReLU operation, a ReLU operation, etc.) on an output generated by the one or more modes. The example controller 502 instructs the example DMA controller 504 to retrieve coefficient data and image data associated with input channels to be convolved and/or otherwise processed. For example, the controller 502 can instruct the DMA controller 504 to retrieve the input data 202 and the coefficient data associated with the filters 204 of FIG. 2 from an example main memory 516.

In some examples, the controller 502 configures one or more components of the CNN accelerator 500 based on the mode. For example, the controller 502 can configure the data store 506 and/or the coefficient store 508 by organizing the data store 506 and/or the coefficient store 508 into one or more random access memory (RAM) (e.g., static RAM (SRAM), dynamic RAM (DRAM), etc.) blocks. In other examples, the controller 502 configures matrices of the connection multiplexer 510 to receive data from the data store 506 in a specific configuration, order, and/or manner (e.g., receive a 1×256, a 2×128, a 4×64, etc., data matrix from the data store 506). In other examples, the controller 502 configures the DPE array 512 to operate in a convolution mode, a pooling mode, or a fully-connected mode.

In some examples, the controller 502 determines a convolution arrangement of the convolution mode. For example, the controller 502 can determine a 1×256, a 2×128, a 4×64, a 8×32, etc., convolution arrangement of the convolution mode. For example, in a 2×128 convolution arrangement, two streams of input channels are summed sequentially for a single location for 128 output channels, where the final result is a summation of the two streams. In some examples, the controller 502 determines a convolution arrangement based on determining a quantity of the DPEs 520 that remain unused during a convolution operation.

In an example where a convolution operation requires 64 input channels and 192 output channels, the controller 502 can determine to use a 4*64 convolution arrangement compared to a 1*256 convolution arrangement. For example, by determining to use the 4*64 convolution arrangement, the CNN accelerator 500 can utilize all 256 of the DPEs 520. In such examples, the 192 output channels can be processed in three batches of 64 output channels, where each one of the 64 output channels are processed by 4 of the DPEs 520 (e.g., 256 DPEs=4 DPEs*64 output channels) to achieve full DPE utilization. By determining to use the 1*256 convolution arrangement, the example CNN accelerator 500 would have 64 unused DPEs 520 because the 192 output channels would be processed in parallel, where each one of the 192 output channels are processed by 1 DPE 520 and, thus, resulting in only 75% DPE utilization. The example controller 502 can determine to use the 4*64 convolution arrangement by determining that the 4*64 convolution arrangement results in a greater DPE utilization than other convolution arrangements.

In some examples, the controller 502 determines and/or otherwise controls an order of operations of the CNN accelerator 500. For example, the controller 502 can select one or more data lines of the data store 506 to process, one or more coefficient blocks of the coefficient store 508 to process, etc. For example, the controller 502 can control an order of operations of the CNN accelerator 500 by generating address commands and/or otherwise selecting data to be processed by selecting addresses of the data store 506, the coefficient store 508, and/or the output buffer 514.

In the illustrated example of FIG. 5, the CNN accelerator 500 includes the DMA controller 504 to retrieve data from the main memory 516 of a computing system. In the illustrated example of FIG. 5, the main memory 516 is a DRAM. Alternatively, the example main memory 516 may be SRAM or any other type of non-volatile or volatile memory. In the illustrated example of FIG. 5, the DMA controller 504 is a memory interface. For example, the DMA controller 504 queries, receives, and/or otherwise retrieves data (e.g., image data, coefficient data, etc.) from the main memory 516 and transfers the retrieved data to the data store 506, the coefficient store 508, etc., via an example data input interface 518.

In the illustrated example of FIG. 5, the CNN accelerator 500 includes the data store 506 to store a data matrix and provision portions of the data matrix to the connection multiplexer 510 for processing. In the illustrated example of FIG. 5, the data store 506 is DRAM. Alternatively, the example data store 506 may be SRAM or any other type of non-volatile or volatile memory. The example data store 506 includes 16 instances of storage, where each instance is 8 kB in size to yield 128 kB in total storage. The example data store 506 is configured as 512 data lines of 128 bits per data line. Alternatively, the example data store 506 may be configured with a different quantity of storage instances, a different storage instance size, a different quantity of data lines, and/or a different quantity of bits per data line. Additional detail corresponding to the example data store 506 is described below in connection with FIGS. 11 and/or 12.

In the illustrated example of FIG. 5, the CNN accelerator 500 includes the coefficient store 508 to store a data matrix of coefficients (e.g., filter coefficients, kernel coefficients, etc.) and provision portions of the data matrix to the DPE array 512 for processing. In some examples, the coefficient store 508 stores one or more bias values and/or one or more scale values. In the illustrated example of FIG. 5, the coefficient store 508 is DRAM. Alternatively, the example coefficient store 508 may be SRAM or any other type of non-volatile or volatile memory. Additional detail corresponding to the example coefficient store 508 is described below in connection with FIGS. 7, 8 and/or 9.

In the illustrated example of FIG. 5, the CNN accelerator 500 includes the connection multiplexer 510 to select portion(s) of data stored in the data store 506. In some examples, the connection multiplexer 510 selects data from the data store 506 based on the convolution arrangement of the CNN accelerator 500. For example, in response to the controller 502 configuring the CNN accelerator 500 to operate based on a 2×128 convolution arrangement, the connection multiplexer 510 selects two sets of 128 floating point (FP) 16-bit (FP16) words (e.g., 2×128 FP16 words) from the data store 506 and transmits the 256 FP16 words to the DPE array 512 for processing.

In the illustrated example of FIG. 5, the CNN accelerator 500 includes the DPE array 512 to perform one or more convolution operations, one or more pooling operations, or one or more fully-connected operations. In some examples, the DPE array 512 performs post-process operations such as, but not limited to, bias operations, parametric rectified linear unit (PReLU) operations, rectified linear unit (ReLU) operations (e.g., ReLU-X operations), or scale operations. In such examples, the DPE array 512 performs one of the operations (e.g., the convolution operation, etc.) or one of the post-process operations based on a command, an instruction, etc., received from the controller 502. In the illustrated example of FIG. 5, the DPE array 512 includes 256 example DPEs 520, where each one of the 256 DPEs 520 can perform an operation (e.g., a convolution operation, a pooling operation, etc.), a post-process operation (e.g., a PReLU operation, a ReLU operation, etc.), etc., substantially in parallel with the other DPEs 520 of the DPE array 512. Alternatively, fewer or more than the 256 DPEs 520 depicted in FIG. 5 may be used. Additional detail corresponding to the DPEs 520 is described below in connection with FIG. 6.

In the illustrated example of FIG. 5, the CNN accelerator 500 includes the example output buffer 514 to store outputs from the DPE array 512 and transmit the outputs to an external computing device, hardware, system, etc., for further processing. The example output buffer 514 of FIG. 5 includes separate read and write ports. The example output buffer 514 has 256 channels, where each one of the channels is a 16-bit input/output (I/O) channel. The example output buffer 514 is one instance of an 8 kilobyte (kB) memory storage configured as 2×8*4096 bit data matrices. For example, the output buffer 514 operates as a ping-pong buffer. Alternatively, the example output buffer 514 may include more than one instance and/or fewer or more than 8 kB of memory storage. Alternatively, the example output buffer 514 may be configured in any other configuration (e.g., 4×4*4096 bit data matrices, 8×2*4096 bit data matrices, etc.).

While an example manner of implementing the example CNN accelerator 500 is illustrated in FIG. 5, one or more of the elements, processes, and/or devices illustrated in FIG. 5 may be combined, divided, re-arranged, omitted, eliminated, and/or implemented in any other way. Further, the example controller 502, the example DMA controller 504, the example data store 506, the example coefficient store 508, the example connection multiplexer 510, the example DPE array 512, the example output buffer 514, the example DPEs 520, and/or, more generally, the example CNN accelerator 500 of FIG. 5 may be implemented by hardware, software, firmware, and/or any combination of hardware, software, and/or firmware. Thus, for example, any of the example controller 502, the example DMA controller 504, the example data store 506, the example coefficient store 508, the example connection multiplexer 510, the example DPE array 512, the example output buffer 514, the example DPEs 520, and/or, more generally, the example CNN accelerator 500 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example controller 502, the example DMA controller 504, the example data store 506, the example coefficient store 508, the example connection multiplexer 510, the example DPE array 512, the example output buffer 514, and/or the example DPEs 520 is/are hereby expressly defined to include a non-transitory computer readable storage device or storage disk such as a memory, a digital versatile disk (DVD), a compact disk (CD), a Blu-ray disk, etc., including the software and/or firmware. Further still, the example CNN accelerator 500 of FIG. 5 may include one or more elements, processes, and/or devices in addition to, or instead of, those illustrated in FIG. 5, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
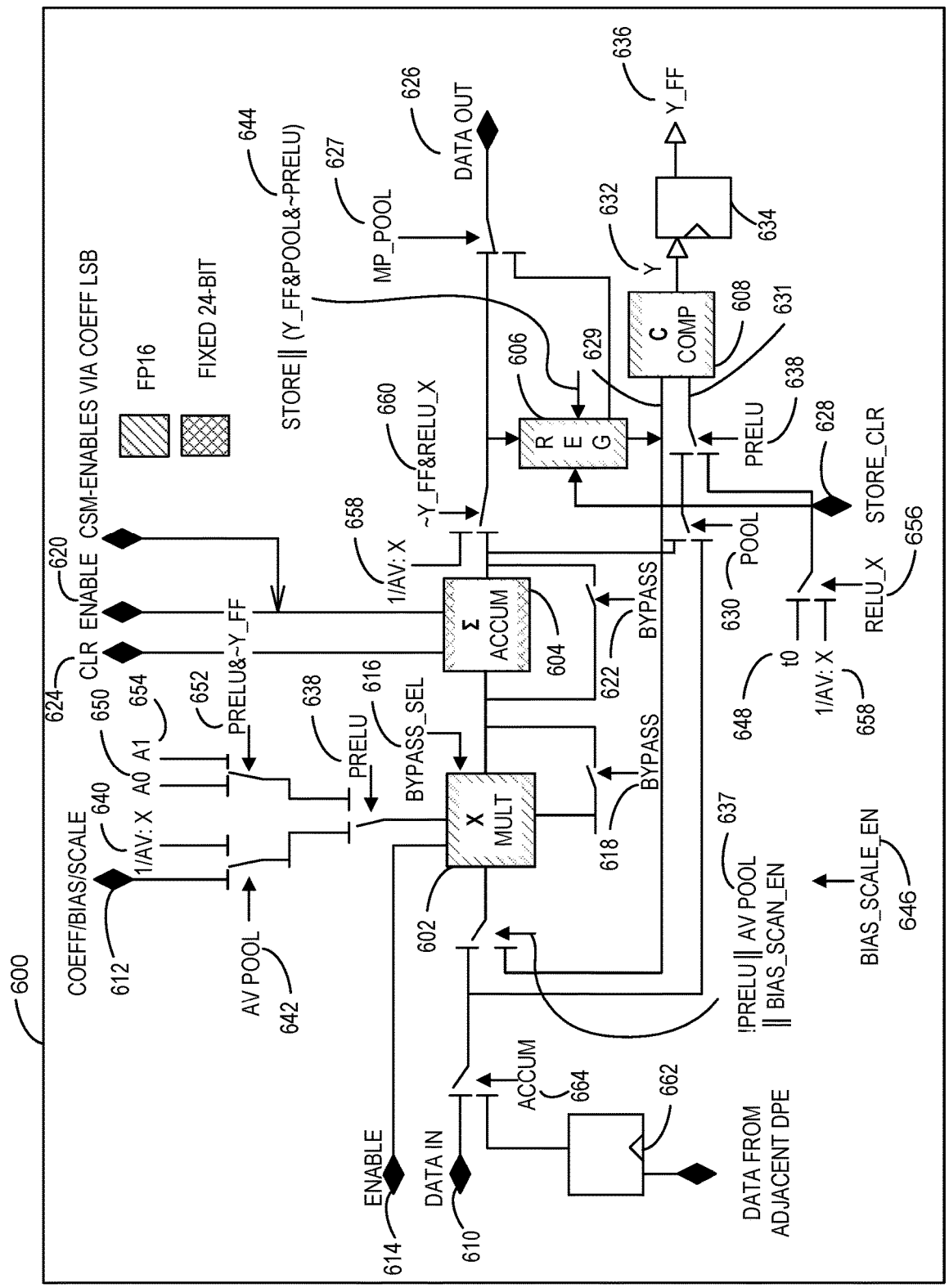
FIG. 6 illustrates an example data path element (DPE).

FIG. 6 illustrates an example DPE 600. For example, the DPE 600 of FIG. 6 can correspond to one or more of the DPEs 520 of FIG. 5. The example DPE 600 of FIG. 6 performs a convolution operation, a pooling operation, or a fully-connected operation. In some examples, the DPE 600 of FIG. 6 performs a post-process operation such as a bias operation, PReLU operation, a ReLU operation (e.g., a ReLU-X operation), a scale operation, etc., based on a mode (e.g., an operation mode) of the example CNN accelerator 500 of FIG. 5. In the illustrated example of FIG. 6, the DPE 600 includes an example multiplier (MULT) 602, an example accumulator (ACCUM) 604, an example register (REG) 606, and an example comparator (COMP) 608.

In the illustrated example of FIG. 6, the DPE 600 includes the multiplier 602 to perform a multiplication operation of two values. In some examples, the multiplier 602 multiplies a first value obtained from a first example interface (DATA IN) 610 and a second value obtained from a second example interface (COEFF/BIAS/SCALE) 612. In the illustrated example of FIG. 6, the first interface 610 is a data store interface. For example, the data received from the first interface 610 can correspond to data from the data store 506 via the connection multiplexer 510 of FIG. 5. In the illustrated example of FIG. 6, the second interface 612 is a coefficient store interface. For example, the data received from the second interface 612 can be a bias value, a coefficient value, a scale value, etc., from the coefficient store 508 of FIG. 5.

In the illustrated example of FIG. 6, the multiplier 602 is a binary multiplier (e.g., one or more binary or logic adders). The example multiplier 602 is enabled based on a signal received from an example enable interface (ENABLE) 614. For example, the signal received from the enable interface 614 can correspond to a binary value (e.g., a low signal associated with a 0 or a high signal associated with a 1) generated by the controller 502 of FIG. 5. The example multiplier 602 is bypassed based on a signal from an example bypass selector interface (BYPASS_SEL) 616. For example, the signal received from the bypass selector interface 616 can correspond to a binary value generated by the controller 502 of FIG. 5. For example, one or more values from the first interface 610 and/or the second interface 612 can be passed through via a first example bypass interface (BYPASS) 618 when the signal from the bypass selector interface 616 is a high signal (e.g., the first bypass interface 618 is enabled). For example, the controller 502 can transmit a signal to the bypass selector interface 616 for a speed increase and/or a power reduction when performing one or more operations of the DPE 600.

In the illustrated example of FIG. 6, the DPE 600 includes the accumulator 604 to perform addition or accumulation operations. The example accumulator 604 of FIG. 6 is a 24-bit accumulator that holds a signed fixed-point value. In some examples, the quantity of integer bits and fractional bits in the FP format is dynamically adjusted during accumulation to ensure a suitable balance of range versus precision is achieved. For example, the accumulator 604 can be adjusted to modify at least one of a range (e.g., a size of data that can accumulated and/or otherwise stored in the accumulator 604) or a precision of the accumulator 604. For example, the accumulator 604 can be initially configured to obtain, process, and/or otherwise handle 12 integer bits. The example accumulator 604 can adjust the 12 integer bits when an input to the accumulator 604 requires a greater number of bits than the available number of integer bits. In such examples, the accumulator 604 increases from 12 integer bits to a quantity of integer bits to match the input at the cost of fractional bits (e.g., range is increased but precision is reduced).

In some examples, the accumulator 604 adjusts and/or otherwise modifies a quantity of integer bits the accumulator 604 can process when a result of accumulator addition overflows. For example, the accumulator 604 can increase the number of integer bits by one and, thus, the number of fractional bits is reduced by one (e.g., range is increased but precision is reduced). In some examples, the accumulator 604 adjusts and/or otherwise modifies the quantity of integer bits the accumulator 604 can process when the result of accumulator addition does not use a full range of integer bits. For example, the accumulator 604 can decrease the number of integer bits by one, subject to a minimum of 12 bits, and, thus, the number of fractional bits is increased by one (e.g., range is decreased, but precision is increased). Alternatively, the example accumulator 604 can increase (e.g., iteratively increase) or decrease (e.g., iteratively decrease) the number of integer bits by more than one.

In examples where a range and/or a precision of the example accumulator 604 is adjusted, the accumulator 604 can generate an approximate value, an estimate value, etc. For example, in response to the accumulator 604 performing a precision balance operation, where the accumulator 604 either increases or decreases a precision increasing a number of bits (e.g., fractional bits), decreasing a number of bits, etc.) of the accumulator 604 to adjust or modify a range of the accumulator 604, the output of the accumulator 604 can result in an approximate value or an estimate value compared to an output where the accumulator 604 was not modified. However, the approximate value, the estimate value, etc., generated by the accumulator 604 is substantially equivalent and/or otherwise commensurate to an output where the accumulator 604 has not been modified. For example, a performance and/or a generation of one or more operations, processes, outputs, etc., of the DPE 600 of FIG. 6 is not affected based on the precision, range, etc., of the accumulator 604 being adjusted. In such examples, any change in operation or outputs are substantially negligible.

In the illustrated example of FIG. 6, the multiplier 602 generates an output to the accumulator 604 based on the multiplication of two values. The example accumulator 604 obtains the output from the multiplier 602 and calculates a sum of the output and a previously calculated sum when a signal from a second example enable interface (ENABLE) 620 indicates that the accumulator 604 is enabled. For example, the signal received from the second enable interface 620 can correspond to a binary value generated by the controller 502 of FIG. 5. For example, the accumulator 604 is enabled when a high signal is received from the second enable interface 620.

In some examples, the accumulator 604 is bypassed based on a signal from the bypass selector interface 616. For example, a value from the multiplier 602 can bypass the accumulator 604 via a second example bypass interface (BYPASS) 622 when a high signal is received from the bypass selector interface 616 (e.g., the second bypass interface 622 is enabled). In some examples, the accumulator 604 is cleared and/or otherwise emptied based on a signal from an example clear accumulator interface (CLR) 624. For example, the signal received from the clear accumulator interface 624 can correspond to a binary value generated by the controller 502 of FIG. 5.

In the illustrated example of FIG. 6, the output of the accumulator 604 is transmitted to at least one of the register 606 or an example data output interface 626. The example data output interface 626 of FIG. 6 is an output buffer interface. For example, the data output interface 626 can transmit data to the output buffer 514 of FIG. 5. The example register 606 of FIG. 6 is an intermediate storage element used to hold results (e.g., individual results) prior to being written to the example data output interface 626. For example, the DPE 600 can use the register 606 to store values for an average pooling operation. The example register 606 is cleared and/or otherwise emptied based on a signal from an example clear register interface (STORE_CLR) 628. For example, the signal received from the clear register interface 628 can correspond to a binary value generated by the controller 502 of FIG. 5. For example, a value stored in the register 606 can be deleted when a high signal is received from the clear register interface 628.

In the illustrated example of FIG. 6, the DPE 600 is configured for convolution mode. In operation, the example multiplier 602 multiplies a data input value (e.g., an activation value, a pixel value, etc., represented in FP16) from the first interface 610 and a coefficient value from the second interface 612 to generate a convolution output value (e.g., an activation, an activation value, an activation output, etc.). The example multiplier 602 transmits the convolution output value to the example accumulator 604. In response to receiving the convolution output value, the example accumulator 604 transmits the convolution output value to the data output interface 626, which, in turn, transmits to the output buffer 514 of FIG. 5.

In some examples, the DPE 600 in convolution mode is configured for optional pooling. For example, the DPE 600 can be configured for a maximum pooling operation in convolution mode based on receiving a high signal from a maximum pooling interface (MP_POOL) 627. In response to receiving the high signal, the DPE 600 waits until an entire pool area is processed prior to transmitting a pool output value (e.g., the maximum value of the pool area 212 of FIG. 2) stored in the example register 606 to the data output interface 626.

In an example maximum pooling operation, the example multiplier 602 multiplies a first data input value from the first interface 610 and a first coefficient value from the second interface 612 to generate a first convolution output value. For example, the first data input value can be a first pixel value, a first activation value, etc., in FP16 from the input data 202 of FIG. 2 and the first coefficient value can be a first coefficient value in FP16 of a first one of the filters 204 of FIG. 2. For example, the first convolution output value can be a first one of the output locations 208 of the pool area 212 of FIG. 2. The example multiplier 602 transmits the first convolution output value to the example accumulator 604, which transmits the first convolution output value to the example register 606. The example register 606 transmits the first convolution value to a first example input 629 of the example comparator 608.

In response to the storing, the example multiplier 602 multiplies a second data input value from the first interface 610 and a second coefficient value from the second interface 612 to generate a second convolution output value. For example, the second data input value can be a second pixel value, a second activation value, etc., from the input data 202 of FIG. 2 and the second coefficient value can be a second coefficient of the first one of the filters 204 of FIG. 2. The example multiplier 602 transmits the second convolution output value to the example accumulator 604. The example accumulator 604 transmits the second convolution output value to a second example input 631 of the comparator 608 when receiving a high signal from an example pool interface (POOL) 630. For example, the signal received from the pool interface 630 can correspond to a binary value generated by the controller 502 of FIG. 5. The example pool interface 630 generates a high signal when pooling is enabled (e.g., average pooling or maximum pooling is enabled) and generates a low signal when pooling is not enabled. For example, the accumulator 604 transmits the second convolution output value to the second input 631 of the comparator 608 when a high signal is received from the pool interface 630. For example, the second convolution output value can be a second one of the output locations 208 of the pool area 212 of FIG. 2.

In the illustrated example of FIG. 6, the comparator 608 determines a maximum value of the first convolution output value and the second convolution output value when the DPE 600 is performing a maximum pooling operation. In response to determining that the first convolution output value (e.g., the stored value in the register 606) is less than the second convolution output value, the example comparator 608 generates a high signal (e.g., a signal corresponding to a binary value of 1) for an example comparator output 632. The high signal for the example comparator output 632 enables an example flip-flop 634 to generate an example logic output (Y_FF) 636 of 1 (e.g., a binary value corresponding to a high signal). For example, the logic output 636 corresponds to a binary value (e.g., a value of 0 or 1). For example, when the logic output 636 is 1, the term is depicted as Y_FF and depicted as ~Y_FF when the logic output 636 is 0 and/or otherwise corresponds to a low signal.

In response to the example logic output 636 being 1 and/or otherwise enabled, the example controller 502 stores the second convolution output value in the register 606 as a pool output value. For example, the controller 502 generates a signal to an example store interface (STORE∥Y_FF&POOL&~PRELU) 644. The signal from the example store interface 644 corresponds to a binary value. In response to receiving a low signal from the example store interface 644, the example controller 502 does not instruct the example register 606 to store a value. In response to receiving a high signal from the example store interface 644, the example controller 502 instructs the register 606 to store the value. For example, a signal from the store interface 644 is a high signal when the logic output 636 is a high signal, the pool interface 630 is a high signal, and an example PReLU interface (PRELU) 638 is a low signal (e.g., the DPE 600 is not performing a PReLU operation). In other examples, the store interface 644 outputs a low signal when at least one of the logic output 636 is a low signal, the pool interface 630 is a low signal, or the PReLU interface 638 is a high signal.

In response to determining that the first convolution output value (e.g., the stored value in the example register 606) is greater than the second convolution output value, the comparator 608 generates a low signal to the example comparator output 632, which instructs the example flip-flop 634 to generate a low signal corresponding to the example logic output 636. In response to the example logic output 636 corresponding to a low signal and/or otherwise disabled, the example controller 502 does not store the second convolution output value in the register 606.

The example DPE 600 processes (e.g., iteratively processes) data input values until an entire pool area (e.g., the pool area 212 of FIG. 2) has been processed. When the entire pool area has been processed, the example register 606 outputs the pool output value (e.g., the maximum value of the pool area 212 of FIG. 2) to the example data output interface 626 when the example maximum pooling interface 627 is enabled.

In other examples, the DPE 600 can be configured for an average pooling operation when operating in the convolution mode. For example, the multiplier 602 can calculate a first output value, a second output value, a third output value, and a fourth output value that correspond to the output locations 208 of the pool area 212 of FIG. 2. The example accumulator 604 can calculate a sum of the first through fourth output values. For example, the multiplier 602 can calculate the first output value, which the accumulator 604 adds to a zero value to generate a first sum based on the first output value. In such examples, the multiplier 602 can calculate the second output value, which the accumulator 604 adds to the first sum to generate a second sum equal to the first and second output values, etc., until a total is calculated and the total is equal to a sum of the first through fourth output values.

In response to calculating the total, the example accumulator 604 stores the total in the example register 606, which, in turn, transmits the total to the example multiplier 602 based on a signal from a third example interface (!PRELU∥AV POOL∥BIAS_SCALE_EN) 637. For example, the signal of the third interface 637 can correspond to a binary value generated by the controller 502 of FIG. 5. For example, the signal of the third interface 637 is a high signal when the DPE 600 is not performing a PReLU operation (e.g., PRELU!=1), the DPE 600 is performing a bias operation or a scale operation (e.g., BIAS_SCALE_EN==1), or the DPE 600 is performing an average pooling operation (e.g., AV_POOL==1). For example, the third interface 637 outputs a high signal for the expression !PRELU∥AV POOL∥BIAS_SCALE_EN when the DPE 600 is performing an average pooling operation.

In response to receiving the total from the example register 606, the example multiplier 602 calculates an average pool value by multiplying the total and an example pool size value (1/AV:X) 640, and outputs the average pool value to the example accumulator 604, which, in turn, outputs the average pool value to the example data output interface 626. The example pool size value 640 corresponds to a size of a pool area. For example, the pool size value 640 can be a quotient of 1/(pool width×pool height). For example, the pool size value 640 associated with the pool area 212 of FIG. 2 is ¼ (e.g., ¼=1/(2×2)). In the illustrated example of FIG. 6, the multiplier 602 retrieves the pool size value 640 based on a signal from an example average pooling interface (AV POOL) 642. For example, the signal from the average pooling interface 642 can correspond to a binary value generated by the controller 502 of FIG. 5. For example, the average pooling interface 642 outputs a high signal when the DPE 600 is performing an average pooling operation.

In some examples, the DPE 600 is configured for a pooling operation. For example, the DPE 600 can obtain a first input value, a second input value, a third input value, and a fourth input value corresponding to the output locations 208 of the pool area 212 of FIG. 2. In such examples, the DPE 600 can determine an average value or a maximum value of the first through fourth input values as described above.

In yet other examples, the DPE 600 can be configured for one or more post processing operations including at least one of a bias operation, a scale operation, a PReLU operation, or a ReLU operation (e.g., a ReLU-X operation). For example, the DPE 600 can be configured for a bias operation, a scale operation, a PReLU operation, or a ReLU-X operation at the output of any layer on a per layer basis. For example, the accumulator 604 can obtain a bias value or a scale value from the second interface 612 based on a signal from an example bias scale enable interface (BIAS_SCALE_EN) 646. For example, the signal from the bias scale enable interface 646 correspond to a binary value. For example, the accumulator 604 can obtain the bias value or the scale value from the second interface 612 when the bias scale enable interface 646 outputs a high signal.

In an example bias operation, the example accumulator 604 adds a bias value retrieved from the second interface 612 to an output value (e.g., a convolution output value, an average pool value, a maximum pool value, a pool output value, etc.) stored in the example register 606. In an example scale operation, the example multiplier 602 multiplies and/or otherwise scales the output value with a scale value retrieved from the second interface 612 when the bias scale enable interface 646 outputs a high value.

In some examples, the DPE 600 is configured for a PReLU operation after the DPE 600 performs a convolution operation, a pooling operation, etc. In such examples, the controller 502 of FIG. 5 generates a high signal to the PReLU interface 638. For example, the signal received from the PReLU interface 638 can correspond to a binary value generated by the controller 502 of FIG. 5. For example, in response to the controller 502 generating a high signal to the PReLU interface 638, the comparator 608 compares a first value corresponding to an output of the convolution operation or the pooling operation and a second value corresponding to an example PReLU base parameter (t0) 648. For example, the first value can be a value of a first one of the output locations 208 of FIG. 2, a maximum value of the pool area 212 of FIG. 2, etc. In the illustrated example of FIG. 2, the PReLU base parameter 648 is a 10-bit signed integer converted to FP16 format. Alternatively, the example PReLU base parameter 648 may be any other quantity of bits and/or in any other format.

In response to the first value (e.g., the stored value in the register 606) being less than the second value (e.g., the example PReLU base parameter (t0) 648), the example comparator 608 outputs a low signal and, thus, causes the example logic output 636 to correspond to a low signal. In response to the example logic output 636 corresponding to a low signal, the example multiplier 602 calculates a first PReLU output value based on a multiplication of a first example PReLU input parameter (a0) 650 and the output value stored in the example register 606. For example, an example PReLU switch interface (PRELU&~Y_FF) 652 outputs a high signal when the PReLU interface 638 outputs a high signal (e.g., the DPE 600 is performing a PReLU operation) and the logic output 636 corresponds to a low signal.

In other examples, when the first value is greater than the second value, the comparator 608 outputs a high signal and, thus, causes the logic output 636 to correspond to a high signal. In response to the example logic output 636 corresponding to a high signal, the example multiplier 602 calculates a second PReLU output value based on a multiplication of a second example PReLU input parameter (a1) 654 and an output value stored in the example register 606. For example, the PReLU switch interface 652 generates a low signal when the PReLU interface 638 outputs a high signal and the logic output 636 corresponds to a high signal. The general form of the PReLU operation is described below in Equation (1) and Equation (2):

$$y=\alpha 0 *x, \text{ if } x<t0 \quad \text{Equation (1)}$$

$$y=\alpha 1 *x, \text{ if } x>t0 \quad \text{Equation (2)}$$

In the illustrated examples of Equations (1)-(2) above, y refers to a PReLU output value calculated by the multiplier 602, x refers to an output value stored in the register 606, α0 refers to the first PReLU input parameter 650, α1 refers to the second PReLU input parameter 654, and t0 refers to the PReLU base parameter 648.

In some examples, the DPE 600 is configured for a ReLU operation (e.g., a ReLU-X operation) after the DPE 600 performs a convolution operation, a pooling operation, etc. In such examples, the controller 502 of FIG. 5 generates a high signal to an example ReLU-X interface (RELU_X) 656. For example, the signal received from the ReLU-X interface 656 can correspond to a binary value. For example, in response to the controller 502 generating a high signal to the ReLU-X interface 656, the comparator 608 compares a first value corresponding to an output of the convolution operation or the pooling operation and a second value corresponding to an example ReLU-X parameter (1/AV:X) 658. For example, the first value can be a value of a first one of the output locations 208 of FIG. 2, a maximum value of the pool area 212 of FIG. 2, etc. In the illustrated example of FIG. 2, the ReLU-X parameter 658 is a FP16 value. Alternatively, the example ReLU-X parameter 658 may be any other quantity of bits and/or in any other format.

In the illustrated example of FIG. 6, the ReLU-X parameter 658 shares a register with the pool size value (1/AV:X) 640. In some examples, the ReLU-X parameter 658 has a value of zero. In such examples, the ReLU-X operation performs a function described below in Equation (3):

$$y=\min(z,(\max(0,x)) \quad \text{Equation (3)}$$

In the example of Equation (3) above, y refers to a ReLU-X output value, x refers to an output value stored in the register 606, and z refers to the ReLU-X parameter 658. For example, when the DPE 600 is configured for an ReLU-X operation, the controller 502 sets the ReLU-X parameter 658 to zero and the comparator 608 determines whether the output value stored in the register 606 is greater than zero. If the example comparator 608 determines that the output value is greater than zero, then the example controller 502 sets the ReLU-X parameter 658 to a ReLU-X value and the comparator 608 determines whether the output value stored in the register 606 is greater than the ReLU-X value. If the example comparator 608 determines that the output value stored in the register 606 is greater than the ReLU-X value, the output value is transmitted to the data output interface 626, otherwise the ReLU-X value is transmitted to the data output interface 626 via an example ReLU-X value interface (~Y_FF&RELU_X) 660.

In the illustrated example of FIG. 6, the multiplier 602, the register 606, and the comparator 608 are FP16 based. For example, the multiplier 602, the register 606, and the comparator 608 can process, store, and/or otherwise handle values in FP16 format. In the illustrated example of FIG. 6, the accumulator 604 is fixed 24-bit based format. For example, the accumulator 604 can process, store, and/or otherwise handle values in fixed 24-bit based format. Alternatively, one or more of the example multiplier 602, the example accumulator 604, the example register 606, and/or the example comparator 608 may be in any other format.

In some examples, the accumulator 604 obtains data from an adjacent DPE via an example adjacent DPE interface 662. For example, the accumulator 604 can obtain data from one of the DPEs 520 of FIG. 5 that is coupled to the DPE 600 of FIG. 6. The example accumulator 604 processes the obtained data from the adjacent DPE in examples where one or more sums of multiple streams are to be calculated (e.g., the convolution operation is split into multiple input streams). For example, the DPE 600 can be configured for a 2*128 convolution arrangement, where the two streams of the input channels 110, 112 of FIG. 1 are summed sequentially for a single location. In such examples, the DPE 600 can obtain an input stream from another DPE 600 when the controller 502 generates a high signal to an example adjacent data interface (ACCUM) 664. For example, in response to the adjacent data interface 664 receiving the high signal, the multiplier 602 receives data from the adjacent DPE via the adjacent DPE interface 662. In such examples, the controller 502 transmits a high signal to the bypass selector interface 616 to enable the first bypass interface 618. In response to the first example bypass interface 618 being enabled, the example multiplier 602 transmits the received data from the adjacent DPE to the example accumulator 604, where the accumulator 604 calculates a total sum based on a first sum calculated by the DPE 600 and a second sum calculated by the adjacent DPE.

Figure 7:
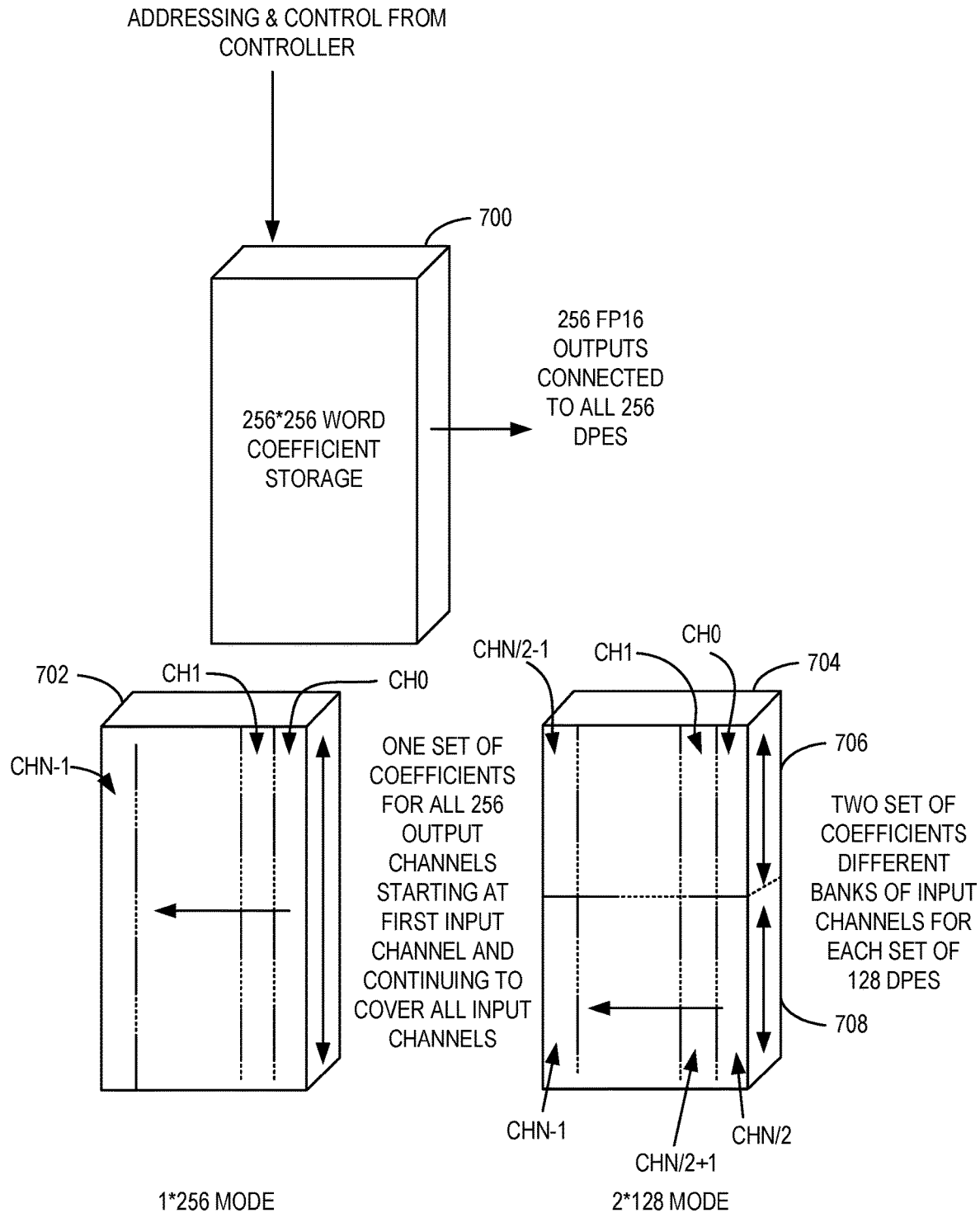
FIG. 7 is an illustration of example coefficient stores.

FIG. 7 is an illustration of a first example coefficient store 700 organized into a second example coefficient store 702 and a third example coefficient store 704 based on an operation mode of the example CNN accelerator 500 of FIG. 5. The example coefficient stores 700, 702, 704 can correspond to the example coefficient store 508 of FIG. 5. For example, the coefficient stores 700, 702, 704 can be addressed and/or controlled from the controller 502 of FIG. 5.

In the illustrated example of FIG. 7, the coefficient stores 700, 702, 704 include separate read and write input/output (I/O) ports or channels. Each of the example coefficient stores 700, 702, 704 have 256 channels (CH0-CH255) where each channel is 16 bits. Each of the example coefficient stores 700, 702, 704 are configured as a single instance of 256*4096 bits to yield 128 kB in total storage. Alternatively, the example coefficient stores 700, 702, 704 may be any other size and/or in any other configuration.

In the illustrated example of FIG. 7, the first coefficient store 700 has 256 channels of 256 FP16 outputs to yield a 256*256 word coefficient storage, where each of the FP16 outputs are connected to one of the DPEs 520 of FIG. 5. In the illustrated example of FIG. 7, the first coefficient store 700 is configured into the second coefficient store 702 by the controller 502 of FIG. 5 when the CNN accelerator 500 is operating in a 1*256 mode. For example, each of the input channels 110, 112 of FIG. 1 are summed sequentially for a single location (e.g., the output channels 122) for each of the output channels 126 of FIG. 1 when operating in a 1*256 mode. For example, 1*256 mode corresponds to one of the DPEs 520 processing 1 input channel to yield output locations in 256 output channels substantially in parallel.

In the illustrated example of FIG. 7, the first coefficient store 700 is configured into the second coefficient store 702 by the controller 502 of FIG. 5 when the CNN accelerator 500 is operating in a 1*256 mode. The second example coefficient store 702 of FIG. 7 is configured as a single block of coefficients, where the single block is divided into 256 columns (e.g., from CH0 to CH255), where each of the 256 columns represents a set of coefficients for all of the input channels 110, 112 of FIG. 1. For example, each of the 256 columns can correspond to one of the filters 114, 116 of FIG. 1.

In the illustrated example of FIG. 7, the first coefficient store 700 is configured into the third coefficient store 704 by the controller 502 of FIG. 5 when the CNN accelerator 500 is operating in a 2*128 mode. For example, two streams of the input channels 110, 112 of FIG. 1 are summed sequentially for a single location (e.g., the output channels 122) for each of the output channels 126 of FIG. 1 when operating in a 2*128 mode. In such examples, the result of 2*128 mode is a summation of the two streams. For example, 2*128 mode corresponds to two of the DPEs 520 processing 1 input channel to yield output locations in 128 output channels substantially in parallel.

In the illustrated example of FIG. 7, the third coefficient store 704 is configured into two example blocks 706, 708 of coefficients, where each of the blocks 706, 708 corresponds to each data RAM block of the data store 506 of FIG. 5. In the illustrated example of FIG. 7, each of the blocks 706, 708 includes 128 columns. For example, the first block 706 includes a first set of 64 channels e.g., CH0 to CH63) and the second block 708 includes a second set of 64 channels (e.g., CH64 to CH127). In the illustrated example of FIG. 7, a column in one of the blocks 706, 708 represents a set of coefficients for half of the input channels 110, 112 of FIG. 1. In the illustrated example of FIG. 7, there are two blocks 706, 708 of 128*FP16 words per address so one of the blocks 706, 708 applies to one of the two sets of DPEs 520 of FIG. 5 for each block of data inputs from the data store 506.

Alternatively, the first example coefficient store 700 may be configured into a fourth coefficient store (not shown) by the example controller 502 of FIG. 5 when the example CNN accelerator 500 is operating in a 4*64 mode. For example, the fourth coefficient store can be configured as 4 blocks of coefficients, where each of the 4 blocks corresponds to each data RAM block of the data store 506 of FIG. 5. For example, the fourth coefficient store can have four blocks of 64*FP16 words per address so one of the four blocks apply to one of the four sets of DPEs 520 of FIG. 5 for each block of data inputs from the data store 506.

Alternatively, the first example coefficient store 700 may be configured into a fifth coefficient store (not shown) by the example controller 502 of FIG. 5 when the example CNN accelerator 500 is operating in an 8*32 mode. For example, the fifth coefficient store can be configured as eight blocks of coefficients, where each of the eight blocks corresponds to each data RAM block of the data store 506 of FIG. 5. For example, the fifth coefficient store can have eight blocks of 32*FP16 words per address so one of the eight blocks apply to one of the eight sets of DPEs 520 of FIG. 5 for each block of data inputs from the data store 506.

Alternatively, the first example coefficient store 700 may be configured into a sixth coefficient store (not shown) by the example controller 502 of FIG. 5 when the example CNN accelerator 500 is operating in a 16*16 mode. For example, the sixth coefficient store can be configured as sixteen blocks of coefficients, where each of the sixteen blocks corresponds to each data RAM block of the data store 506 of FIG. 5. For example, the sixth coefficient store can have sixteen blocks of 16*FP16 words per address so one of the sixteen blocks apply to one of the sixteen sets of DPEs 520 of FIG. 5 for each block of data inputs from the data store 506.

For example, four streams of the input channels 110, 112 of FIG. 1 are summed sequentially for a single location (e.g., the output channels 122) for each of the output channels 126 of FIG. 1 when operating in a 4*64 mode. In such examples, the result of 4*64 mode is a summation of the four streams. For example, 4*64 mode corresponds to four of the DPEs 520 processing 1 input channel to yield outputs of 64 output channels substantially in parallel.

FIG. 8 is an example table 800 depicting an example addressing model for the example coefficient store 508 of FIG. 5. In the example table 800 of FIG. 8, an example address sequence column (ADDRESS SEQUENCE) 802 describes an addressing scheme for the example coefficient store 508. In the example address sequence column 802, the term CH STR IN refers to an input channel stride value and the term CH STR OUT refers to an output channel stride value. In the example table 800 of FIG. 8, an example input channel column (INPUT CHANNEL) 804 represents an input channel (e.g., the input channels 110, 112 of FIG. 1) for a convolution operation.

In the example table 800 of FIG. 8, an example data column (DATA [127:0]) 806 represents 128-bit words that store a single coefficient 16-bit word for each of eight channels at a time, effectively occupying a 16-bit channel regardless of coefficient mode (e.g., 1*256 mode, 2*128 mode, etc.). For example, FP16 fully occupies the 16-bit channel, 2 uf8 coefficients occupy the 16-bit channel, etc. An example coefficient column (COEFFICIENT) 808 represents an index of a filter (e.g., a coefficient of the first filter 114 of FIG. 1).

FIG. 9 is an example table 900 depicting an example addressing model for the example coefficient store 508 of FIG. 5 based on non-FP16 formats. In the example table 900 of FIG. 9, 16-bits are allocated to each channel. Within each of the 16-bit channels (e.g., CH0, CH1, CH7, etc.) In an example data column (DATA [127:0]) 902, the data is packed for all input channels. For non-FP16 modes, an input channel stride (CH STR IN) has no direct meaning, but is calculated as the stride so that when multiplied by a quantity of channels per RAM (CH_PER_RAM), the stride will correctly reach the next RAM block (e.g., CH STR IN could be aligned on a non-128-bit boundary). An example of a 4-bit palletized image for 3×3 convolution (e.g., 9 coefficients) is described below:

Example 3×3 filter with 4 channels, 8-bit coefficient: Coeff Stride (In)=4.5 lines=0x0048h.

Example 2×2 filter with 4 channels, 4-bit coefficient: Coeff Strid (In)=2.25 lines=0x0024h.

Figure 10:
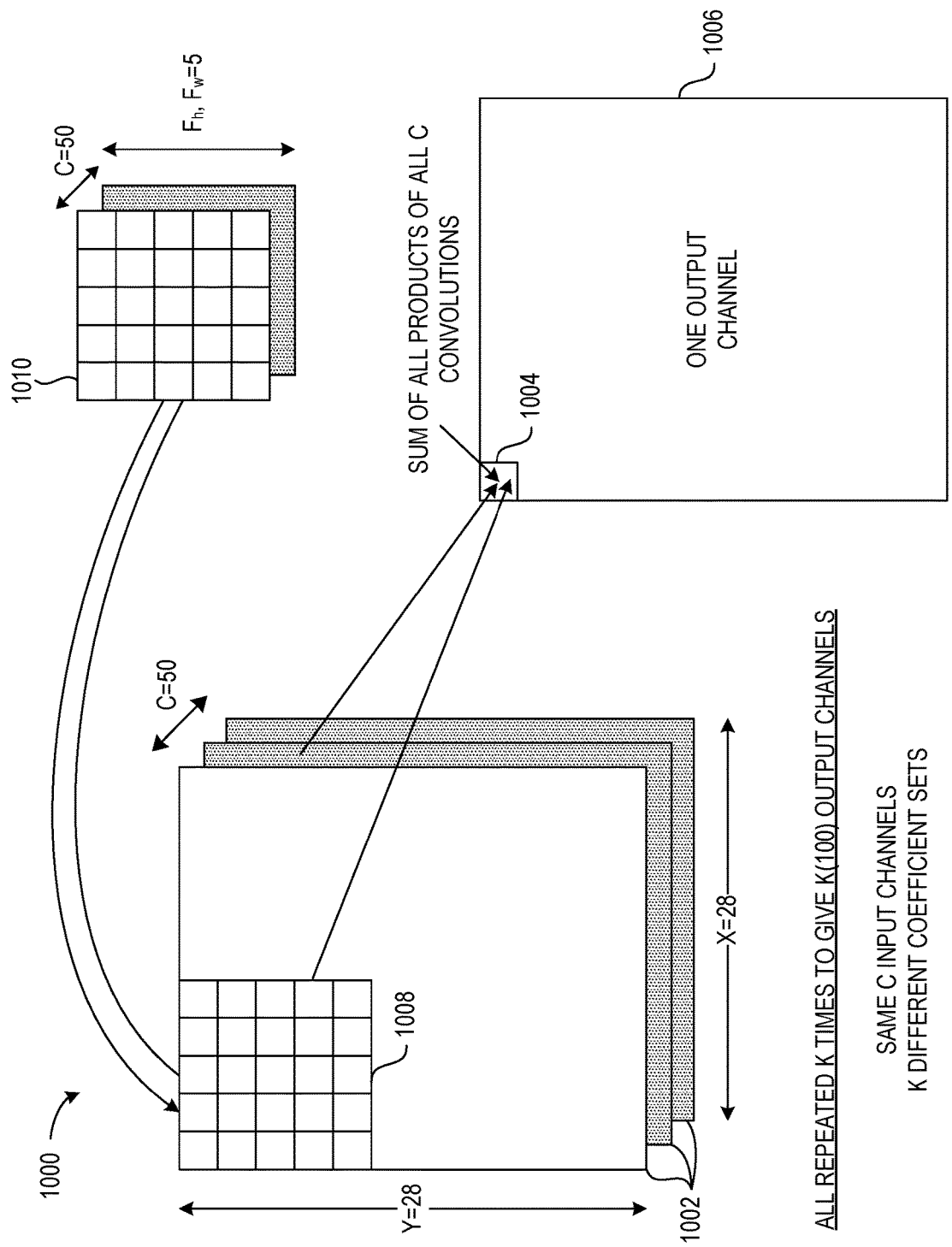
FIG. 10 illustrates an example convolution operation to implement the examples disclosed herein.

FIG. 10 illustrates an example convolution operation 1000 to implement the examples disclosed herein. For example, the convolution operation 1000 can be executed by the CNN accelerator 500 of FIG. 5. In the illustrated example of FIG. 10, the convolution mode of the convolution operation 1000 is 1*256 mode, where each one of example input channels 1002 are summed sequentially for a single example output location 1004 for an example output channel 1006 for a plurality of output channels.

In the illustrated example of FIG. 10, the input channels 1002 have dimensions of 28 pixels wide (X=28) and 28 pixels tall (Y=28) and 50 channels deep (C=50). Example input locations 1008 for the example input channels 1002 are processed using example filters 1010 with dimensions of 5 pixels wide (Fw=5), 5 pixels tall (Fh=5), and 50 channels deep (C=50). Alternatively, the example input channels 1002 may correspond to a secondary convolution layer of the CNN (e.g., a convolution layer after an initial convolution layer). For example, the input channels 1002 may include activations compared to pixel values.

In the illustrated example of FIG. 10, the output location 1004 is determined by calculating a sum of all products of all convolutions of the input locations 1008 of the input channels 1002 and the filters 1010. Additional output locations of the example output channel 1006 are processed by convolving the remaining input locations of the example input channels 1002 until an entirety of the input locations are processed. In response to processing the entirety of the input locations of the example input channels 1002, the example CNN accelerator 500 uses a different set of filters to calculate another output channel. In the illustrated example of FIG. 10, the CNN accelerator 500 convolves (e.g., iteratively convolves) the input channels 1002 with a different set of filters for 100 sets of filters to generate 100 output channels.

Figure 11:
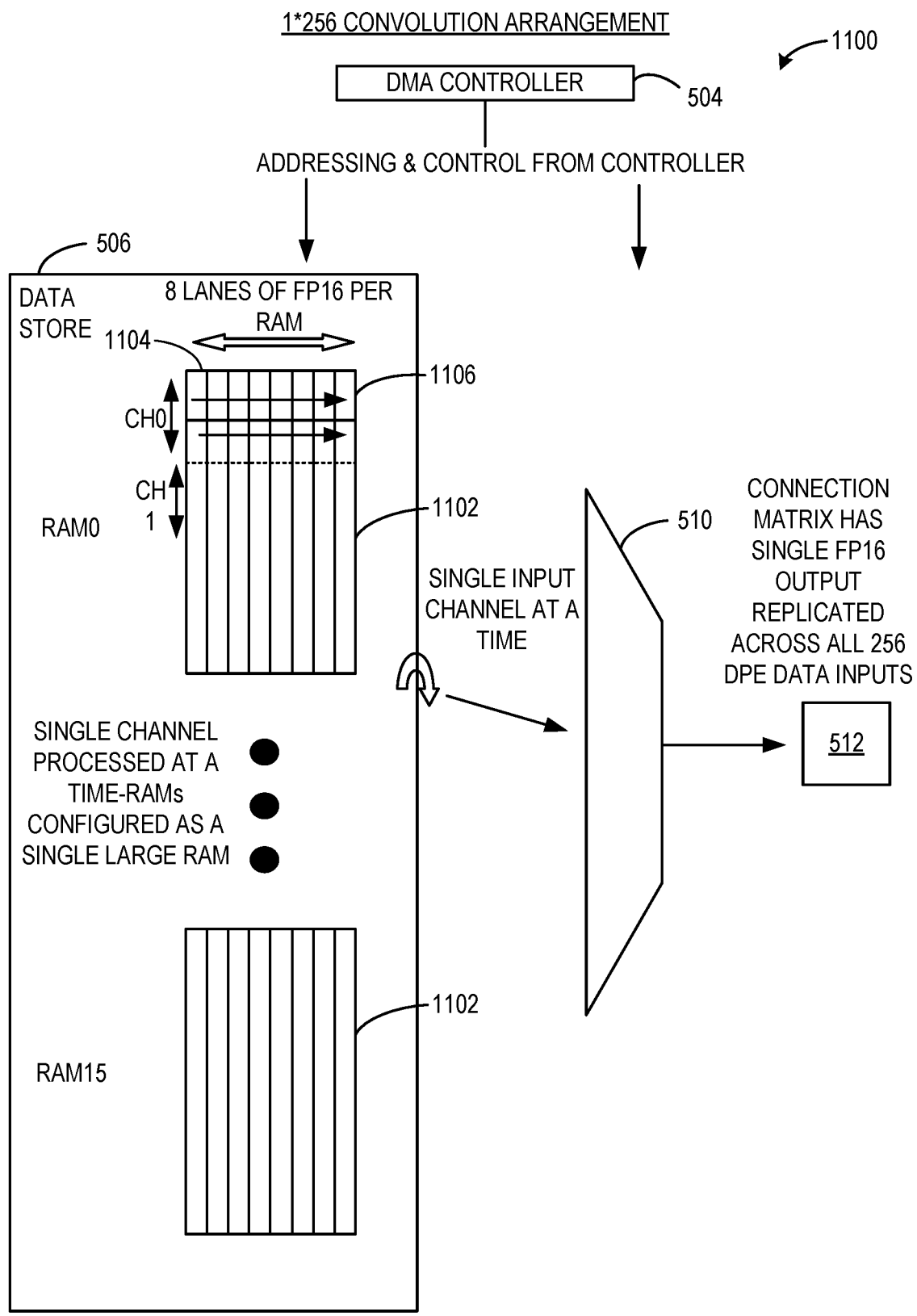
FIG. 11 illustrates an example operation of an example connection multiplexer based on an example 1*256 convolution arrangement.

FIG. 11 illustrates an example operation 1100 of the example connection multiplexer 510 of FIG. 5 based on a 1*256 convolution arrangement. In the illustrated example of FIG. 11, the connection multiplexer 510 has a single FP16 output replicated across all 256 of the DPEs 520 of FIG. 5. In the illustrated example of FIG. 11, the connection multiplexer 510 selects the FP16 data from the data store 506.

In the illustrated example of FIG. 11, the data store 506 is configured based on a 1*256 convolution arrangement. The data store 506 depicted in the example of FIG. 11 is organized into 16 example blocks (RAM0-RAM15) 1102 configured as a single large RAM. Each of the blocks 1102 includes eight example columns 1104 of FP16 words and each of the eight columns 1104 includes a plurality of example data lines 1106. Alternatively, the example blocks 1102 may have fewer or more than eight columns and/or fewer or more than the data lines depicted in FIG. 11. In the illustrated example of FIG. 11, each of the data lines 1106 includes eight words of the input channel. The example connection multiplexer 510 selects the appropriate word of the eight input words for each cycle based on the filter, and the current input channel being processed. The example controller 502 of FIG. 5 determines the address of the appropriate word based on the input channel stride. The example controller 502 determines the overall address based on combining at least one of the RAM address and the connection matrix address.

In the illustrated example of FIG. 11, a single input channel is processed at a time. For example, during a first clock cycle, the connection multiplexer 510 selects a first two of the data lines 1106 of each of the blocks 1102 corresponding to the first input channel and outputs the plurality of the data lines 1106 to respective ones of the DPEs 520 of FIG. 1. For example, the connection multiplexer 510 can select 32 of the data lines 1106 (e.g., 32 data lines=(2 data lines/block)×(16 blocks)), where each data line 1106 includes 128 bits (e.g., 128 bits=(16 bits/word)×(8 words/data line)) to yield 4096 bits (e.g., 4096 bits=(128 bits/data line)×(2 data lines/block)×16 blocks) to be processed by the DPEs 520. In such examples, during a second clock cycle, the connection multiplexer 510 can select the next two data lines 1106 of each of the 16 blocks 1102 corresponding to the second input channel and output the plurality of the data lines 1106 to respective ones of the DPEs 520 for processing. In such examples, the addressing and control sequencing of the data store 506, the connection multiplexer 510, etc., are conducted by at least one of the controller 502 or the DMA controller 504 of FIG. 5.

Figure 12:
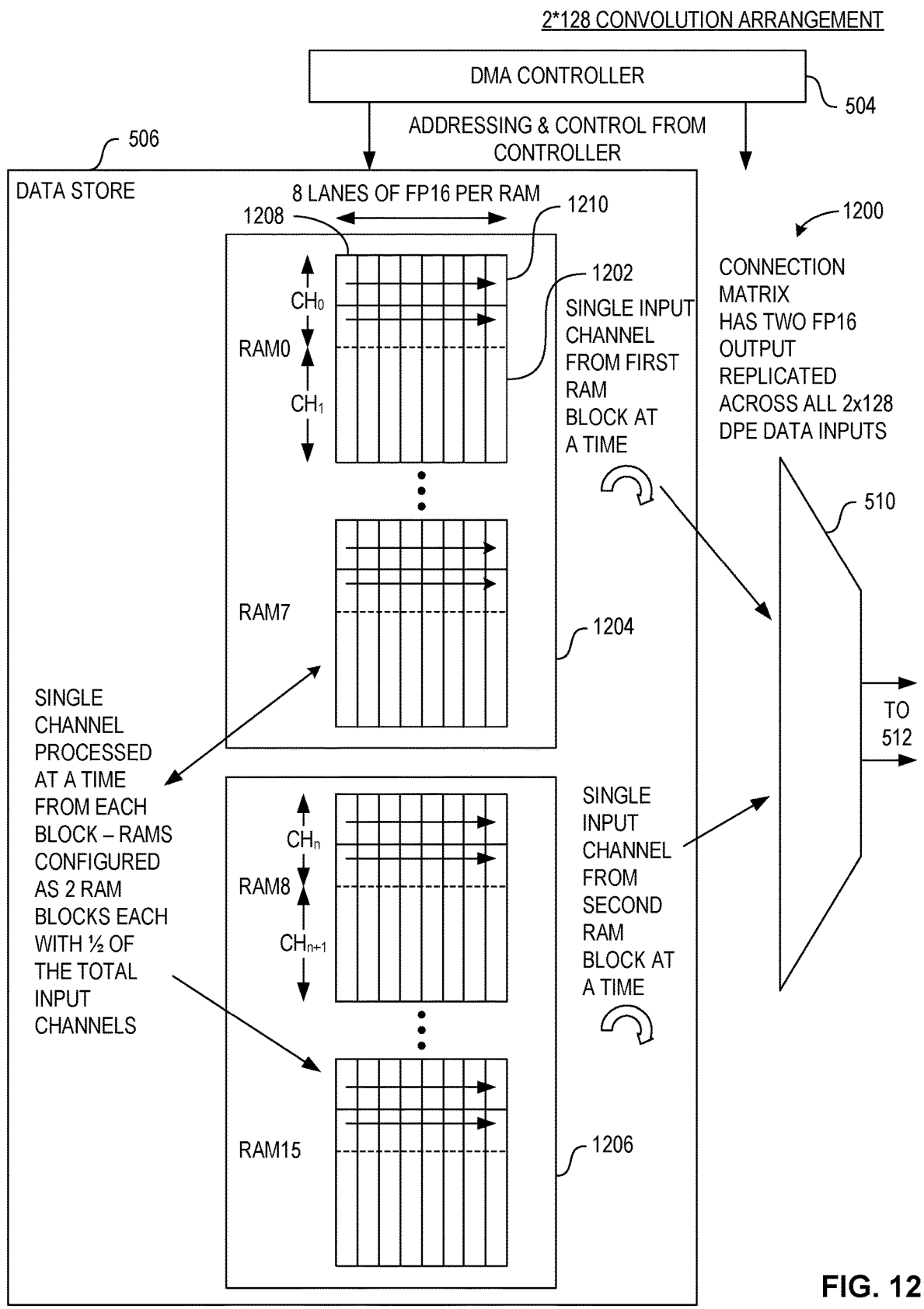
FIG. 12 illustrates an example operation of an example connection multiplexer based on an example 2*128 convolution arrangement.

FIG. 12 illustrates an example operation 1200 of the example connection multiplexer 510 of FIG. 5 based on a 2*128 convolution arrangement. In the illustrated example of FIG. 12, the connection multiplexer 510 has two FP16 outputs replicated across both sets of 128 of the DPEs 520 of FIG. 5. In the illustrated example of FIG. 12, the connection multiplexer 510 selects the FP16 data from the data store 506.

In the illustrated example of FIG. 12, the data store 506 is configured based on a 2*128 convolution arrangement. The data store 506 depicted in the example of FIG. 12 is organized into 16 example blocks (RAM0-RAM15) 1202 configured as two example RAM blocks 1204, 1206. The first example RAM block 1204 includes RAM0-RAM7 and the second example RAM block 1206 includes RAM8-RAM15. Each of the blocks 1202 includes eight example columns 1208 of FP16 words and each of the eight columns 1208 includes a plurality of example data lines 1210. In the illustrated example of FIG. 12, the first RAM block 1204 includes a first half of the input channel set and the second RAM block 1206 includes a second half of the input channel set. Alternatively, the example blocks 1202 may have fewer or more than eight columns and/or fewer or more than the data lines depicted in FIG. 12.

In the illustrated example of FIG. 12, a single input channel is processed at a time. For example, during a first clock cycle, the connection multiplexer 510 selects a first two of the data lines 1210 of each of the blocks 1202 included in the first RAM block 1204 and a first two of the data lines 1210 of each of the blocks 1202 included in the second RAM block 1206, where the selected data lines 1210 correspond to a first input channel to be processed. The example connection multiplexer 510 outputs the plurality of the data lines 1210 to respective ones of the DPEs 520 of FIG. 1. For example, the connection multiplexer 510 can select 16 of the data lines 1210 from the first RAM block 1204 and 16 of the data lines 1210 from the second RAM block 1206, where each data line 1210 includes 128 bits to yield 4096 bits to be processed by the DPEs 520.

In such examples, during a second clock cycle, the connection multiplexer 510 can select the next two data lines 1210 of each of the blocks 1202 in the first RAM block 1204 and the next two data lines 1210 of each of the blocks 1202 in the second RAM block 1206 corresponding to a second input channel to be processed. The example connection multiplexer 510 outputs the plurality of the data lines 1210 to respective ones of the DPEs 520 for processing. In such examples, the addressing and control sequencing of the data store 506, the connection multiplexer 510, etc., are conducted by at least one of the controller 502 or the DMA controller 504 of FIG. 5.

Figure 13:
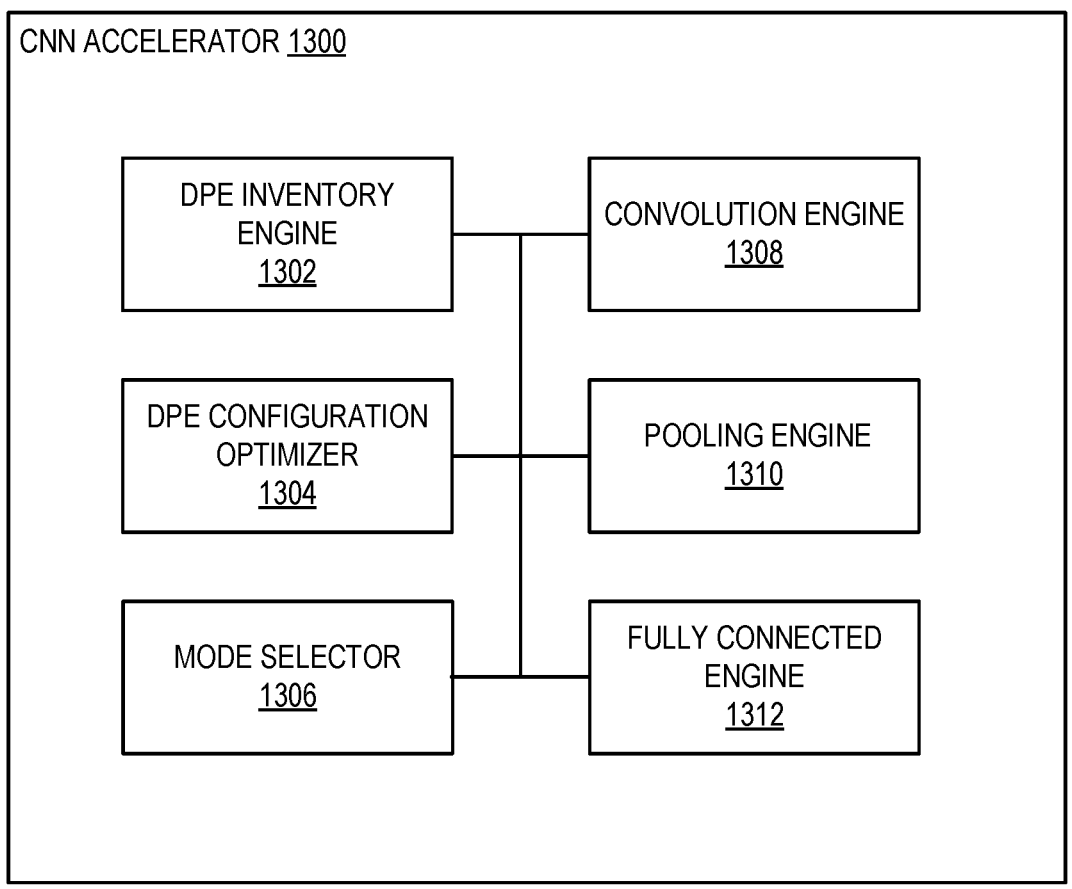
FIG. 13 is a block diagram of an example implementation of another example CNN accelerator to implement the example CNN accelerator of FIG. 5.

FIG. 13 is a block diagram of an example implementation of an example CNN accelerator 1300 to implement the example CNN accelerator 500 of FIG. 5. The example CNN accelerator 1300 of FIG. 13 accelerates convolution operations by processing a plurality of input channels and/or generating one or more output channels substantially in parallel (e.g., substantially simultaneously). In the illustrated example of FIG. 13, the CNN accelerator 1300 includes an example DPE inventory engine 1302, an example DPE configuration optimizer 1304, an example mode selector 1306, an example convolution engine 1308, an example pooling engine 1310, and an example fully connected engine 1312.

In the illustrated example of FIG. 13, the CNN accelerator 1300 includes the DPE inventory engine 1302 to inventory and/or otherwise identify available DPEs that reside on a platform (e.g., the CNN accelerator 500 of FIG. 5). The example DPE inventory engine 1302 can correspond to the example controller 502 of FIG. 5. In the illustrated example of FIG. 13, the DPE inventory engine 1302 implements means for querying, determining, characterizing, and/or identifying DPEs that reside on the platform. In some examples, the DPE inventory engine 1302 determines a quantity of the DPEs 520 of FIG. 5 available for processing. In some examples, the DPE inventory engine 1302 determines a convolution arrangement, a mode, etc., of the one or more DPEs 520 of FIG. 5, and/or, more generally, the CNN accelerator 500 of FIG. 5.

In the illustrated example of FIG. 13, the CNN accelerator 1300 includes the example DPE configuration optimizer 1304 to select and/or otherwise determine a DPE configuration, mode, etc., to increase (e.g., maximize) and/or otherwise optimize DPE resource utilization and to reduce (e.g., minimize) and/or otherwise optimize power consumption. The example DPE configuration optimizer 1304 can correspond to the example controller 502 of FIG. 5. In the illustrated example of FIG. 13, the DPE configuration optimizer 1304 implements means for determining a DPE configuration, mode, etc., to increase DPE resource utilization and to reduce power consumption. For example, the DPE configuration can correspond to a configuration of the data store 506, the coefficient store 508, the DPE array 512, etc., when the CNN accelerator 500 is in a convolution mode, a pooling mode, a fully connected mode, etc. The example DPE configuration optimizer 1304 implements means to provide optimum operation of the example CNN accelerator 500 of FIG. 5 using substantially low power (e.g., little or no repeated data movement) and maximum hardware utilization.

In some examples, to reduce data movement, a total number of outputs and a total coefficient set can be kept in the example coefficient store 508 of FIG. 5. In some examples, the DPE configuration optimizer 1304 determines a configuration of the coefficient store 508 based on filter dimensions to reduce data movement. For example, for a filter size of 3×3 using FP16 coefficients, the DPE configuration optimizer 1304 can determine a limit of approximately 28 input channels (e.g., 28≈256/9, where the coefficient store 508 has 256 locations). In such examples, the DPE configuration optimizer 1304 determines the limit of 28 input channels to ensure that the total number of outputs and the total coefficient set can be stored in the coefficient store 508 of FIG. 5.

In some examples, the DPE configuration optimizer 1304 decreases the quantity of output channels, where each reduction in mode yields a doubling of input channel handling capability. For example, the DPE configuration optimizer 1304 can change from a 1*256 convolution arrangement to a 2*128 convolution arrangement or a 4*64 convolution arrangement to provide the same acceleration, but with less overall power usage. In some examples, the DPE configuration optimizer 1304 deploys circular buffer management when all input channels (e.g., input image data) or all coefficients associated with an image do not fit in the coefficient store 508. For example, the DPE configuration optimizer 1304 can configure a per channel circular buffer management system, where all channels are continually replenished at the earliest opportunity from memory (e.g., SRAM, DRAM, etc.) to ensure no or minimal stalling.

In some examples, the DPE configuration optimizer 1304 halts and/or otherwise prevents the CNN accelerator 1300 from proceeding with an operation (e.g., a convolution operation, a pooling operation, a fully-connected operation, etc.) based on a DPE utilization resulting from using a convolution arrangement. For example, the DPE configuration optimizer 1304 can select the 1*256 convolution arrangement as a first convolution arrangement to be analyzed, evaluated, processed, etc. In such examples, the DPE configuration optimizer 1304 can determine that the 1*256 convolution arrangement results in a first DPE utilization of 75% based on 64 out of 256 DPEs 520 of the DPE array 512 being unused during an operation of the CNN accelerator 1300 based on operation requirements (e.g., a quantity of input channels, a quantity of output channels, etc., to be processed or generated). The example DPE configuration optimizer 1304 can compare the first DPE utilization of 75% to a 90% DPE utilization threshold and determine that the first DPE utilization does not satisfy the DPE utilization threshold based on the comparison (e.g., the first DPE utilization of 75% is less than the 90% DPE utilization threshold). In response to determining that the first DPE utilization does not satisfy the DPE utilization threshold, the example DPE configuration optimizer 1304 can halt the example CNN accelerator 1300 from executing an operation with the first convolution arrangement until another convolution arrangement is generated, determined, and/or evaluated for DPE utilization.

In some examples, in response to the halting, the DPE configuration optimizer 1304 selects a second convolution arrangement such as the 4*64 convolution arrangement to be processed. In such examples, the DPE configuration optimizer 1304 can determine that the 4*64 convolution arrangement results in a second DPE utilization of 100% based on 0 out of 256 DPEs 520 of the DPE array 512 being unused during an operation of the CNN accelerator 1300 based on the operation requirements. The example DPE configuration optimizer 1304 can compare the second DPE utilization of 100% to the 90% DPE utilization threshold and determine that the second DPE utilization satisfies the DPE utilization threshold based on the comparison e.g., the second DPE utilization of 100% is greater than the 90% DPE utilization threshold). In response to determining that the second DPE utilization satisfies the DPE utilization threshold, the example DPE configuration optimizer 1304 can instruct the example CNN accelerator 1300 to execute the operation with the second convolution arrangement. Additionally or alternatively, the example DPE configuration optimizer 1304 can compare the second DPE utilization to the first DPE utilization and instruct the example CNN accelerator 1300 to execute the operation with the second convolution arrangement based on the second convolution arrangement having a greater DPE utilization than the first convolution arrangement.

In some examples, the DPE configuration optimizer 1304 adjusts (e.g., dynamically adjusts, dynamically configures, etc. a configuration of the accumulator 604 of the DPEs 520. In some examples, the DPE configuration optimizer 1304 decreases a number of integer bits of the accumulator 604 when the input values do not require the existing number of integer bits available to the accumulator 604. For example, the DPE configuration optimizer 1304 can decrease a number of integer bits that the accumulator 604 can process to increase a range but reduce a precision of the accumulator 604. In some examples, the DPE configuration optimizer 1304 increases a number of integer bits of the accumulator 604 when the accumulator 604 overflows. For example, the configuration optimizer 1304 can increase a number of integer bits that the accumulator 604 can process to increase the range but reduce the precision of the accumulator 604.

In the illustrated example of FIG. 13, the CNN accelerator 1300 includes the mode selector 1306 to select a mode of operation, an operation to be performed, and/or a convolution arrangement. The example mode selector 1306 can correspond to the example controller 502 of FIG. 5. In the illustrated example of FIG. 13, the mode selector 1306 implements means for selecting a mode of operation such as a convolution mode, a pooling mode, a fully-connected mode, etc., and configuring the CNN accelerator 1300 based on the selected mode. In some examples, the mode selector 1306 selects an optional pooling mode within the convolution mode. In some examples, the mode selector 1306 selects a post-process operation within one of the modes. For example, the mode selector 1306 can instruct the DPEs 520 of FIG. 5 to perform a bias operation, a scale operation, a PReLU operation, a ReLU operation, etc., after completing a convolution operation in the convolution mode, after completing a pooling operation in the pooling mode, etc.

In some examples, the mode selector 1306 configures the CNN accelerator 500 of FIG. 5 based on the selected mode. For example, the mode selector 1306 can configure the data store 506, the coefficient store 508, the DPE array 512, etc., of FIG. 5 based on the selected mode. For example, the mode selector 1306 can configure the coefficient store 508 for convolution mode by instructing the DMA controller 504 to transmit coefficient values to the coefficient store 508. In other examples, the mode selector 1306 can configure the DPE array 512 for a bias operation, a scale operation, etc., by instructing the coefficient store 508 to transmit a bias parameter, a scale parameter, etc., to the DPE array 512 to process.

In the illustrated example of FIG. 13, the CNN accelerator 1300 includes the convolution engine 1308 to perform and/or otherwise facilitate a convolution operation on image data associated with an input image. The example convolution engine 1308 can correspond to the example controller 502 of FIG. 5. For example, the convolution engine 1308 can correspond to the controller 502 instructing and/or otherwise directing the data store 506, the coefficient store 508, one or more of the DPEs 520, etc., to perform a convolution operation. In the illustrated example of FIG. 13, the convolution engine 1308 includes means to convolve a plurality of input channels including activation values, pixel values, etc., with a plurality of filters to generate a plurality of output channels substantially in parallel. For example, the convolution engine 1308 includes means to facilitate a convolution operation using one or more DPEs 520 of the DPE array 512.

In some examples, the convolution engine 1308 performs convolution by obtaining image data (e.g., activation values, pixel values, etc.) associated with an input image (e.g., the input image 106 of FIG. 1), convolving the image data with filter coefficients associated with image features of interest to be detected in the input image, and generating outputs associated with the overlap of the image data with the filter coefficients. In such examples, the model selector 1306 configures the data store 506, the coefficient store 508, the DPE array 512, etc., of FIG. 5 based on a convolution arrangement.

In an example where the mode selector 1306 selects a 2*128 convolution arrangement, the example convolution engine 1308 configures the example data store 506 into two RAM blocks as described above in connection with FIG. 12. The example convolution engine 1308 configures the coefficient store 508 into two coefficient blocks as described above in connection with the third example coefficient store 704 of FIG. 7. The example convolution engine 1308 loads a portion or a full complement of data lines for each input channel to be processed in the example data store 506 and loads coefficients associated with the input data into the example coefficient store 508 of FIG. 5 so that the data lines and the coefficients align with respective ones of the DPEs 520 of FIG. 5.

In response to the example data store 506 and the example coefficient store 508 being loaded and/or otherwise configured, the example convolution engine 1308 performs a convolution operation (e.g., the convolution operation 1000 of FIG. 10) substantially in parallel for a first output location (e.g., the output location 1004 of FIG. 10). For example, the convolution engine 1308 implements the convolution operation by addressing and transmitting appropriate words (e.g., words associated with the input locations 1008) stored in the data store 506 to respective ones of the DPEs 520 while the coefficients included in the coefficient store 508 are cycled through to the DPEs 520 to generate convolution output values.

The example convolution engine 1308 processes (e.g., iteratively processes) the words until an entirety of the words (e.g., an entirety of the words associated with the input locations 1008 of FIG. 10) are processed. In some examples, the convolution engine 1308 performs a post process operation (e.g., a bias operation, a scale operation, a PReLU operation, a ReLU operation, etc.) when all the words for an input location have been processed. Using the input channel stride, the example convolution engine 1308 convolves the next channel(s) using the DPEs 520 until all input locations are processed of the input channels are processed to generate convolution output values.

In some examples, the convolution engine 1308 performs an optional pooling operation (e.g., an average pooling operation, a maximum pooling operation, etc.) on the convolution outputs within the convolution mode. For example, the convolution engine 1308 can determine an average value, a maximum value, etc., of a pool area (e.g., the pool area 212 of FIG. 2) to an output buffer (e.g., the output buffer 514 of FIG. 5) as a pool output. The example convolution engine 1308 writes the pool outputs, and/or, more generally, outputs of the DPEs 520 from the output buffer 514 to memory when the output buffer 514 is full (e.g., a threshold quantity of values has been calculated per DPE 520).

In the illustrated example of FIG. 13, the CNN accelerator 1300 includes the pooling engine 1310 to perform a pooling operation such as an average pooling operation or a maximum pooling operation on one or more convolution outputs. The example pooling engine 1310 can correspond to the example controller 502 of FIG. 5. For example, the pooling engine 1310 can correspond to the controller 502 instructing and/or otherwise directing the data store 506, the coefficient store 508, one or more of the DPEs 520, etc., to perform a pooling operation within a pooling mode. In the illustrated example, the pooling engine 1310 implements means to perform a pooling operation on a set of convolution outputs generated by the convolution engine 1308.

In some examples, the pooling engine 1310 processes a pool area to generate a pool output. For example, the pooling engine 1310 can process the pool area 212 of FIG. 3 to generate the output location 302 of FIG. 3 based on an average value, a maximum value, etc., of the pool area 212. For example, the pooling engine 1310 can output data every 4 clock cycles for a 2×2 pool, every 9 clock cycles for a 3×3 pool, etc. The example pooling engine 1310 performs an average pooling operation by calculating a sum of data in a pool area and multiplies the sum by 1/AV, where AV is a pool size determined by calculating the pool width multiplied by the pool height. The example pooling engine 1310 performs a maximum pooling operation by determining a maximum value of the pool area.

In the illustrated example of FIG. 13, the CNN accelerator 1300 includes the fully connected engine 1312 to use outputs from the convolution engine 1308 (e.g., convolution outputs) and/or the pooling engine 1310 (e.g., pool outputs) to classify an input image (e.g., the input image 106 of FIG. 1) into various classes based on a training dataset. The example fully connected engine 1312 of FIG. 13 can correspond to the controller 502 of FIG. 5. For example, the controller 502 can instruct the data store 506, the coefficient store 508, the DPE array 512, etc., to perform a fully connected operation (e.g., generate the output array 406 of FIG. 4). In the illustrated example of FIG. 13, the fully connected engine 1312 implements means to classify image features of an input image based on convolution outputs and/or pool outputs to detect and/or otherwise identify image features included in an input image.

In some examples, the CNN accelerator 1300 implements the CNN accelerator 500 of FIG. 5 by using one or more linked lists. A linked list is a linear collection of data elements, in which linear order is not given by their physical placement in memory, but, instead each of the data elements points to a next one of the data elements. In some examples, the linked lists are stored in system memory. For example, the linked lists can be stored in the main memory 516 of FIG. 5 and executed by the controller 502 of FIG. 5. In some examples, the linked lists facilitate sub-functions, which concatenate to form macro functions. In some examples, there is no limit to the quantity of sub-functions as the convolution engine 1308, the pooling engine 1310, the fully connected engine 1312, etc., can sequentially go through each operation until a NULL link is reached indicating the end of the macro-function. For example, the controller 502 can break the overall CNN function of the CNN accelerator 500 down into clearly identifiable blocks and execute each of the blocks until a NULL link is reached.

In some examples, the CNN accelerator 1300 of FIG. 13 maintains two or more separate linked lists. The example CNN accelerator 1300 of FIG. 13 can execute and/or otherwise process the two or more linked lists in round robin fashion by default or in any other manner. In some examples, the CNN accelerator 1300 of FIG. 13 can lock or freeze one or more of the linked lists to ensure that one of the linked lists is completed before handing off to a second one of the linked lists.

The example DPE inventory engine means, the example DPE configuration optimizer means, the example mode selector means, the example convolution engine means, the example pooling engine means, and/or the example fully connected engine means is/are implemented by software executing on a hardware processor. Additionally or alternatively, the example DPE inventory engine means, the example DPE configuration optimizer means, the example mode selector means, the example convolution engine means, the example pooling engine means, and/or the example fully connected engine means could instead be implemented by a logic circuit structured to perform logic operations to achieve the desired functionality, such as an ASIC, an FPGA, or the like and/or a combination of such circuits and software and/or firmware.

While an example manner of implementing the example CNN accelerator 1300 is illustrated in FIG. 13, one or more of the elements, processes, and/or devices illustrated in FIG. 13 may be combined, divided, re-arranged, omitted, eliminated, and/or implemented in any other way. Further, the example DPE inventory engine 1302, the example DPE configuration optimizer 1304, the example mode selector 1306, the example convolution engine 1308, the example pooling engine 1310, the example fully connected engine 1312, and/or, more generally, the example CNN accelerator 1300 of FIG. 13 may be implemented by hardware, software, firmware, and/or any combination of hardware, software, and/or firmware. Thus, for example, any of the example DPE inventory engine 1302, the example DPE configuration optimizer 1304, the example mode selector 1306, the example convolution engine 1308, the example pooling engine 1310, the example fully connected engine 1312, and/or, more generally, the example CNN accelerator 1300 of FIG. 13 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example DPE inventory engine 1302, the example DPE configuration optimizer 1304, the example mode selector 1306, the example convolution engine 1308, the example pooling engine 1310, and/or the example fully connected engine 1312 is/are hereby expressly defined to include a non-transitory computer readable storage device or storage disk such as a memory, a digital versatile disk (DVD), a compact disk (CD), a Blu-ray disk, etc., including the software and/or firmware. Further still, the example CNN accelerator 1300 of FIG. 13 may include one or more elements, processes, and/or devices in addition to, or instead of, those illustrated in FIG. 13, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the CNN accelerator 1300 of FIG. 13 is shown in FIGS. 14-18. The machine readable instructions may be an executable program or portion of an executable program for execution by a computer processor such as the processor 1912 shown in the example processor platform 1900 discussed below in connection with FIG. 19. The program may be embodied in software stored on anon-transitory computer readable storage medium such as a CD-ROM, a floppy disk, a hard drive, a DVD, a Blu-ray disk, or a memory associated with the processor 1912, but the entire program and/or parts thereof could alternatively be executed by a device other than the processor 1912 and/or embodied in firmware or dedicated hardware. Further, although the example program is described with reference to the flowcharts illustrated in FIGS. 14-18, many other methods of implementing the example CNN accelerator 1300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 14-18 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 14:
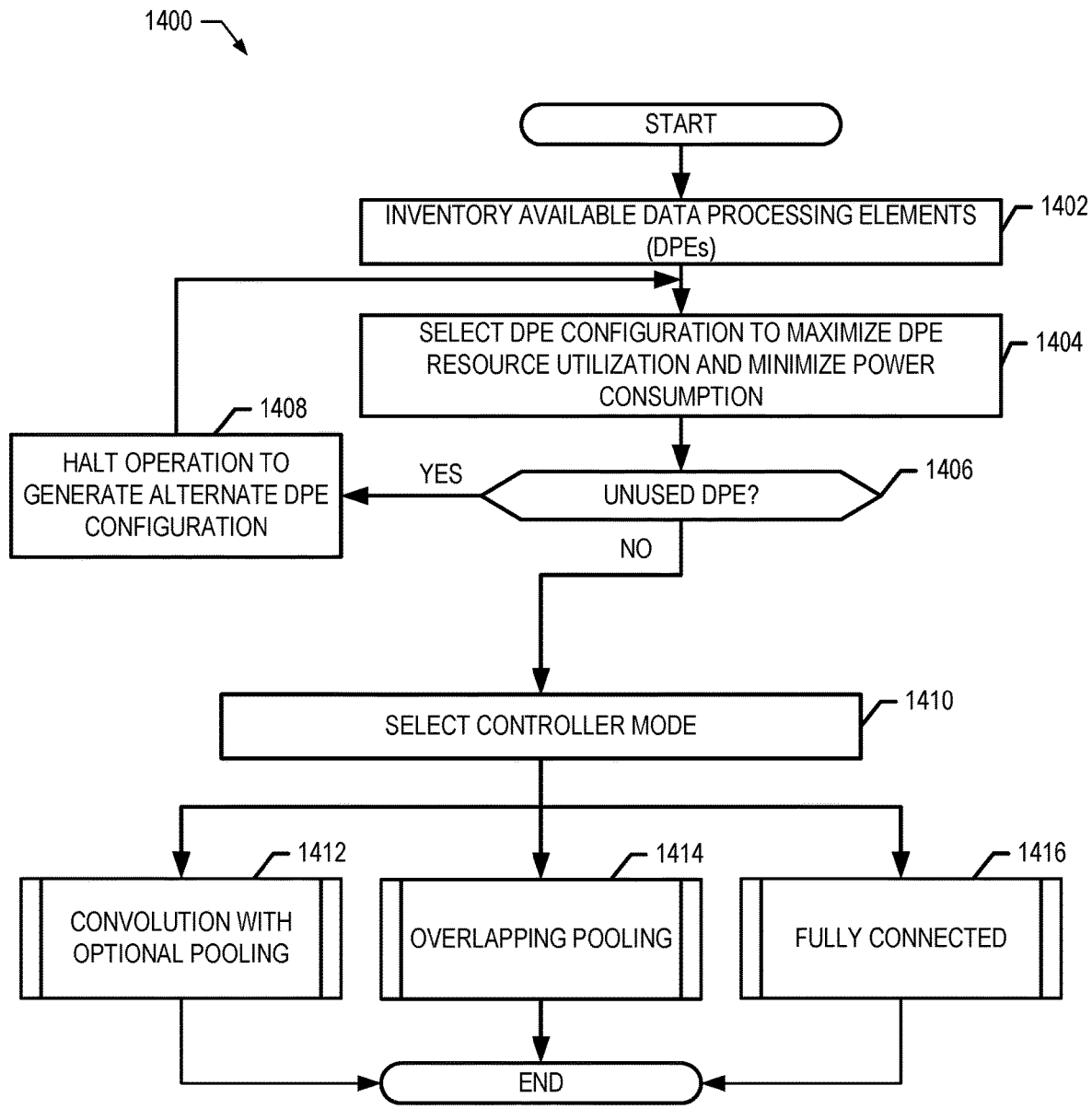
FIG. 14 is a flowchart representative of example machine readable instructions that may be executed to implement the CNN accelerator of FIG. 5 and/or the CNN accelerator of FIG. 13 to process image data associated with an input image.

FIG. 14 is a flowchart representative of example machine readable instructions 1400 that may be executed to implement the CNN accelerator 500 of FIG. 5 and/or the CNN accelerator 1300 of FIG. 13 to process image data associated with an input image. The example machine readable instructions 1400 of FIG. 14 begin at block 1402, at which the example CNN accelerator 1300 inventories available data processing elements (DPEs). For example, the DPE inventory engine 1302 can determine an availability of the DPEs 520 for processing, a configuration and/or a mode of one or more of the DPEs 520, etc.

At block 1404, the example CNN accelerator 1300 selects a DPE configuration to maximize DPE resource utilization and minimize power consumption. For example, the DPE configuration optimizer 1304 can determine to use a 1*256 convolution arrangement, a 2*128 convolution arrangement, etc., based on a filter size, a quantity of input channels to be processed, a desired quantity of output channels to be generated, etc., to increase DPE resource utilization and reduce power consumption. In such examples, the DPE configuration optimizer 1304 can limit a quantity of the input channels to ensure that an entirety of the image data associated with the input channels and the corresponding coefficients can be entirely stored in the CNN accelerator 500 of FIG. 5 to reduce (e.g., minimize) data movement to reduce power consumption while maintaining a substantially high DPE resource utilization (e.g., 75% utilization, 100% utilization, etc.).

In response to selecting the DPE configuration, the example CNN accelerator 1300 determines whether the DPE configuration leads to or results in one or more unused DPEs at block 1406. In an example where the operational requirements include 64 input channels and 192 output channels, the DPE configuration optimizer 1304 determines to use the 4*64 convolution arrangement, cycled 3 times for all inputs based on the 4*64 resulting in a higher DPE utilization compared to other convolution arrangements e.g., 1*256, 2*128, 4*32, etc.).

If, at block 1406, the example CNN accelerator 1300 determines that there are unused DPE, control proceeds to block 1408 to halt an operation of the CNN accelerator 1300 to generate an alternate DPE configuration. For example, the DPE configuration optimizer 1304 can determine to prevent or withhold an advancement of an operation of the CNN accelerator 1300 until a threshold amount of available DPEs 520 are assigned, designated, etc., for the operation. For example, the DPE configuration optimizer 1304 can determine to generate an alternate convolution arrangement of the DPEs 520 to increase a DPE utilization above a DPE utilization threshold. For example, if the DPE configuration optimizer 1304 selected a 1*256 convolution arrangement at block 1404, 64 unused DPEs 520 would result in a 75% DPE utilization throughout the convolution operation and, thus, lead to a longer convolution time compared to other convolution arrangements such as the 4*64 convolution arrangement, which would result in 0 unused DPEs 520 and a corresponding 100% DPE utilization.

In such examples, the DPE configuration optimizer 1304 can generate and/or otherwise determine the 4*64 convolution arrangement at block 1408. For example, the DPE configuration optimizer 1304 can determine to use the 4*64 convolution arrangement based on the DPE utilization of the 4*64 convolution arrangement being greater than (1) a DPE utilization of a previously generated convolution arrangement (e.g., the 1*256 convolution arrangement and/or (2) a DPE utilization threshold (e.g., 75% DPE utilization, 90% DPE utilization, etc.). For example, the DPE configuration optimizer 1304 can generate and determine to use the 4*64 convolution arrangement based on a corresponding DPE utilization satisfying a DPE utilization threshold (e.g., the DPE utilization being greater than the DPE utilization threshold). In response to generating the alternate DPE configuration at block 1408, control returns to block 1404 to select the DPE configuration generated at block 1408. Alternatively, if there is no alternate DPE configuration that results in no unused DPEs 520 or satisfies a DPE utilization threshold, control may proceed from block 1406 to block 1410 (e.g., after a timeout period, after evaluating a DPE utilization of one or more convolution arrangements, etc.) to proceed with a current DPE configuration, generate an alert indicating that there is no alternate DPE configuration, or halt an operation of the CNN accelerator 1300.

If, at block 1406, the example CNN accelerator 1300 determines that there are no unused DPE, then, at block 1410, the CNN accelerator 1300 selects a controller mode. For example, the mode selector 1306 can determine to operate in a convolution with optional pooling mode, an overlapping pooling mode, or a fully connected mode.

In response to selecting a convolution with optional pooling mode, control proceeds to block 1412 to begin operating in a convolution with optional pooling mode. An example process that can be used to implement block 1412 is described below in connection with FIG. 15. For example, the controller 502 can instruct the DPEs 520 to operate in a convolution mode, a convolution mode with pooling, etc.

In response to selecting an overlapping pooling mode, control proceeds to block 1414 to begin operating in an overlapping pooling mode. An example process that can be used to implement block 1414 is described below in connection with FIG. 16. For example, the controller 502 can instruct the DPEs 520 to operate in an overlapping pooling mode.

In response to selecting a fully connected mode, control proceeds to block 1416 to begin operating in a fully connected mode. An example process that can be used to implement block 1416 is described below in connection with FIG. 17. For example, the controller 502 can instruct the DPEs 520 to operate in a fully connected mode. In response to concluding and/or otherwise performing a convolution with optional pooling operation at block 1412, an overlapping pooling operation at block 1414, or a fully connected operation at block 1416, the example machine readable instructions 1400 conclude.

Figure 15:
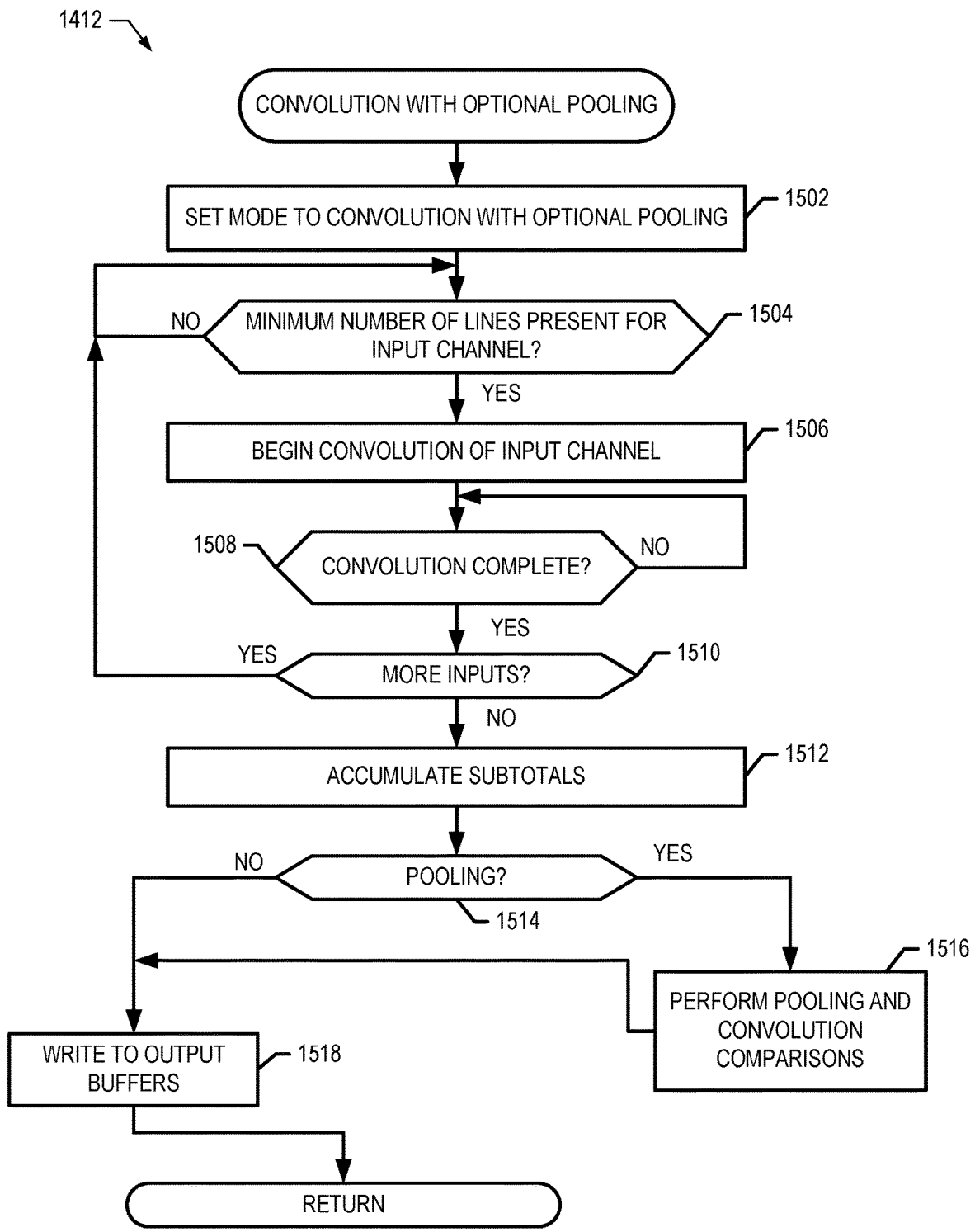
FIG. 15 is a flowchart representative of example machine readable instructions that may be executed to implement the CNN accelerator of FIG. 5 and/or the CNN accelerator of FIG. 13 to perform a convolution operation with optional pooling.

FIG. 15 is a flowchart representative of example machine readable instructions 1412 that may be executed to implement the CNN accelerator 500 of FIG. 5 and/or the CNN accelerator 1300 of FIG. 13 to perform convolution with optional pooling. The example machine readable instructions 1412 can implement block 1412 of the example machine readable instructions 1400 of FIG. 14. The example machine readable instructions 1412 of FIG. 15 begin at block 1502, at which the example CNN accelerator 1300 sets the mode of the CNN accelerator 1300 to convolution with optional pooling. For example, the mode selector 1306 can configure the CNN accelerator 1300 for a convolution with optional pooling mode.

At block 1504, the example CNN accelerator 1300 determines whether a minimum number of lines are present for an input channel. For example, the convolution engine 1308 can determine whether a minimum number of lines are present in storage to convolve an input channel of interest. For example, the DMA controller 504 of FIG. 5 can transmit a number of data lines necessary for one or more input channels to be processed to the data store 506.

If, at block 1504, the example CNN accelerator 1300 determines that the minimum number of lines are not present for the input channel, control waits at block 1504 until the minimum number of lines become available. If, at block 1504, the example CNN accelerator 1300 determines that the minimum number of lines are present for the input channel, control proceeds to block 1506 to begin convolution of the input channel. For example, the convolution engine 1308 can convolve one of the input channels 1002 of FIG. 10 with one of the filters 1010 of FIG. 10 to generate convolution output values.

In response to beginning convolution of the input channel, control proceeds to block 1508 to determine whether convolution is complete. For example, the convolution engine 1308 can convolve one of the input channels 1002 with one of the filters 1010 until an entirety of values for the input location 1008 of FIG. 10 has been processed. If, at block 1508, the example CNN accelerator 1300 determines that convolution is not complete, control waits until convolution is complete, otherwise control proceeds to block 1510 to determine whether there are more inputs to process. For example, the convolution engine 1308 can determine that there are additional activation values, pixel values, etc., included in the input location 1008 to be processed.

If, at block 1510, the example CNN accelerator 1300 determines that there are more inputs to process, control returns to block 1504 to determine whether the minimum number of lines are present to process the additional inputs. If, at block 1510, the example CNN accelerator 1300 determines that there are no inputs left to process, then, at block 1512, the CNN accelerator 1300 accumulates the subtotals (e.g., calculate a sum of the convolution output values corresponding to the input location 1008 of FIG. 10). For example, the convolution engine 1308 can accumulate the subtotals.

At block 1514, the example CNN accelerator 1300 determines whether pooling is enabled. For example, the mode selector 1306 can determine to enable average pooling, maximum pooling, etc. If, at block 1514, the example CNN accelerator 1300 determines that pooling is not enabled, control proceeds to block 1518 to write to output buffers. For example, the convolution engine 1308 can output the accumulated value of the convolution outputs for the input location 1008 of FIG. 10 to an output buffer to generate the output location 1004 of FIG. 10. In response to writing to the output buffers, the example machine readable instructions 1412 of FIG. 15 return to the example machine readable instructions 1400 of FIG. 14 to conclude. For example, the convolution engine 1308 generated the output location 1004 corresponding to the input location 1008 of the input channels 1002 being convolved with the filters 1010. In such examples, the convolution engine 1308 can convolve (e.g., iteratively convolve) the remaining input locations of the input channels 1002 to generate the output channel 1006.

If, at block 1514, the example CNN accelerator 1300 determines that pooling is enabled, control proceeds to block 1516 to perform pooling and convolution comparisons. For example, the pooling engine 1310 can calculate an average value or a maximum value of a pool area of the output channel 1006. In response to performing the pooling and convolution comparisons to generate a pool output value, control proceeds to block 1518 to write the pool output value to the output buffers.

Figure 16:
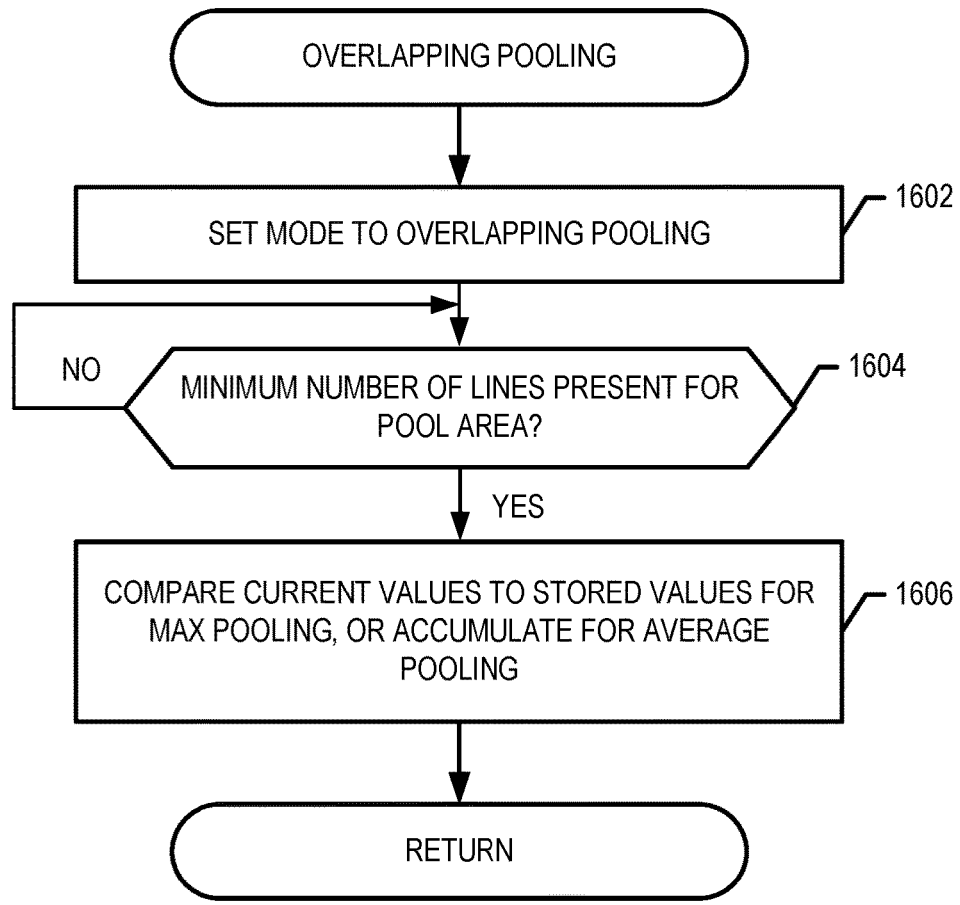
FIG. 16 is a flowchart representative of example machine readable instructions that may be executed to implement the CNN accelerator of FIG. 5 and/or the CNN accelerator of FIG. 13 to perform an overlapping pooling operation.

FIG. 16 is a flowchart representative of example machine readable instructions 1414 that may be executed to implement the CNN accelerator 500 of FIG. 5 and/or the CNN accelerator 1300 of FIG. 13 to perform overlapping pooling. The example machine readable instructions 1414 of FIG. 14 can be used to implement block 1414 of the example machine readable instructions 1400 of FIG. 14. The example machine readable instructions 1414 of FIG. 14 begin at block 1602, at which the example CNN accelerator 1300 sets the mode of the CNN accelerator 1300 to overlapping pooling. For example, the mode selector 1306 can configure the CNN accelerator 1300 for an overlapping pooling mode.

In response to setting the mode to overlapping pooling, the example CNN accelerator 1300 determines whether a minimum number of lines are present for a pool area at block 1604. For example, the pooling engine 1310 can determine whether a minimum number of lines are present in storage to process a pool area. For example, the DMA controller 504 of FIG. 5 can transmit a number of data lines necessary to process the pool area 212 of FIG. 2 to the data store 506.

If, at block 1604, the example CNN accelerator 1300 determines that the minimum number of lines are not present for the pool area, control waits at block 1604 until the minimum number of lines become available. If, at block 1604, the example CNN accelerator 1300 determines that the minimum number of lines are present for the pool area, control proceeds to block 1606 compare current values to stored values for max pooling or accumulate for average pooling. For example, the pooling engine 1310 can compare (e.g., iteratively compare) values of the pool area to determine a maximum value of the pool area when configured for maximum pooling. In other examples, the pooling engine 1310 can accumulate the values of the pool area and calculate an average value of the pool area based on a size of the pool area and the accumulated values of the pool area. In response to calculating the maximum pool value or the average pool value, the example machine readable instructions 1414 of FIG. 16 return to the example machine readable instructions 1400 of FIG. 14 to conclude.

Figure 17:
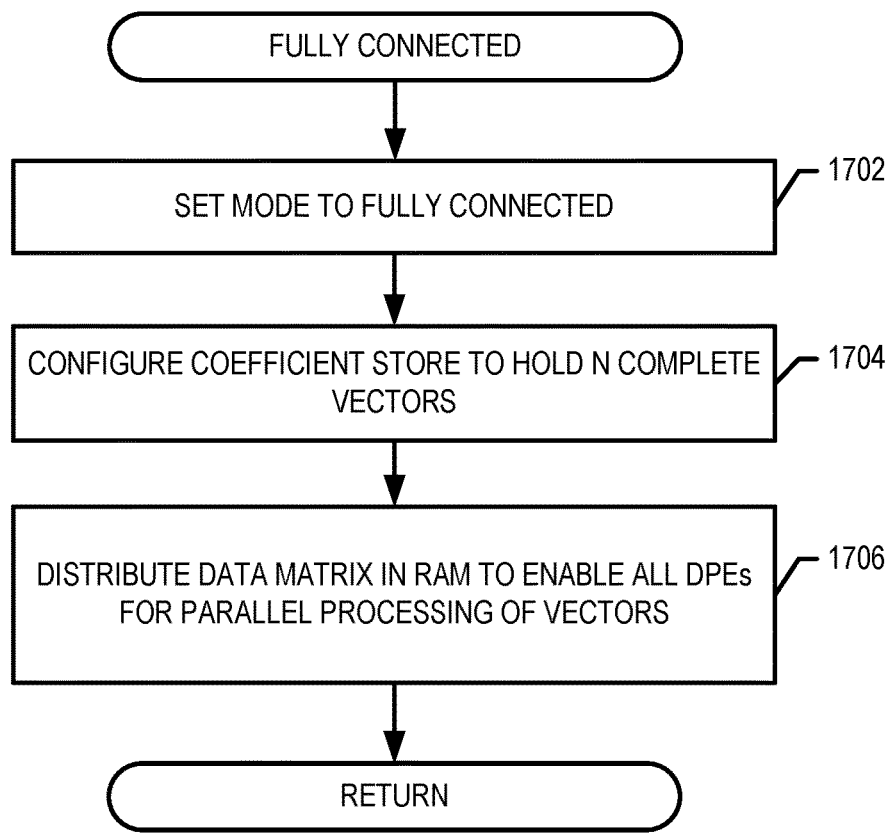
FIG. 17 is a flowchart representative of example machine readable instructions that may be executed to implement the CNN accelerator of FIG. 5 and/or the CNN accelerator of FIG. 13 to perform a fully connected operation.

FIG. 17 is a flowchart representative of example machine readable instructions 1416 that may be executed to implement the CNN accelerator 500 of FIG. 5 and/or the CNN accelerator 1300 of FIG. 13 to perform a fully connected operation. The example machine readable instructions 1416 of FIG. 17 can be used to implement block 1416 of the example machine readable instructions 1400 of FIG. 14. The example machine readable instructions 1416 of FIG. 17 begin at block 1702, at which the example CNN accelerator 1300 sets the mode of the CNN accelerator 1300 to fully connected mode. For example, the mode selector 1306 can configure the CNN accelerator 1300 for a fully connected mode.

In response to setting the mode to fully connected mode at block 1702, the example CNN accelerator 1300 configures a coefficient store to hold N complete vectors at block 1704. For example, the controller 502 of FIG. 5 can instruct the DMA controller 504 to transmit the coefficient array 404 of FIG. 4 to the coefficient store 508 of FIG. 5.

At block 1706, the example CNN accelerator 1300 distributes a data matrix in RAM to enable all DPEs for parallel processing of the vectors. For example, the controller 502 of FIG. 5 can instruct the DMA controller 504 to transmit data (e.g., the convolution output values, the pool output values, etc.) from the main memory 516 of FIG. 5 to the data store 506, which, in turn, transmits the data to the DPEs 520 via the connection multiplexer 510, where each of the DPEs 520 generate and/or otherwise calculate a portion of the output array 406 of FIG. 4 substantially in parallel with the other DPEs 520. In response to processing the vectors, the example machine readable instructions 1416 of FIG. 17 return to the example machine readable instructions 1400 of FIG. 14 to conclude.

Figure 18:
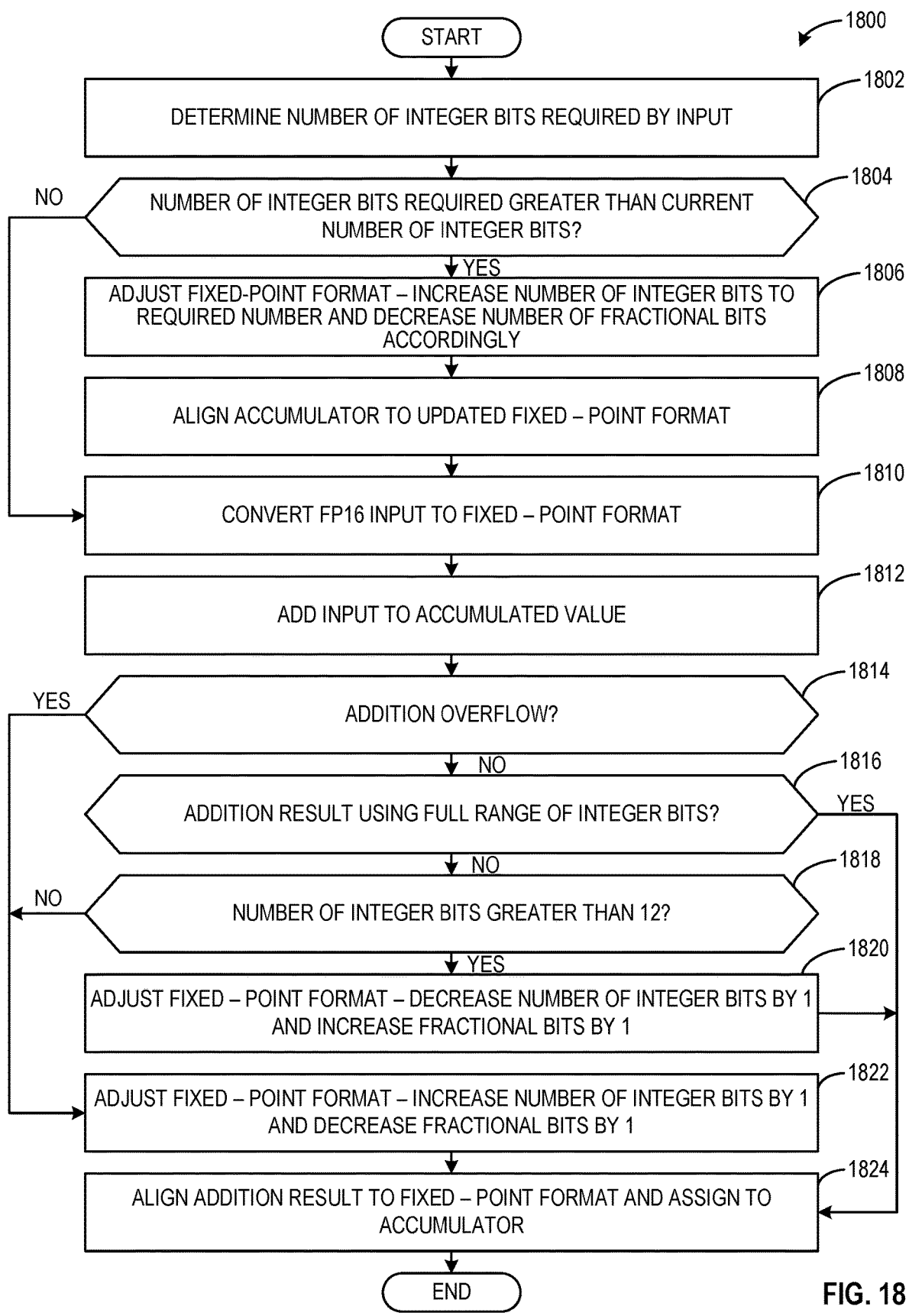
FIG. 18 is a flowchart representative of example machine readable instructions that may be executed to implement the CNN accelerator of FIG. 5 and/or the CNN accelerator of FIG. 13 to configure an example accumulator.

FIG. 18 is a flowchart representative of example machine readable instructions 1800 that may be executed to implement the CNN accelerator 500 of FIG. 5 and/or the CNN accelerator 1300 of FIG. 13 to configure (e.g., dynamically configure) an accumulator. The example machine readable instructions 1800 begin at block 1802, at which the example CNN accelerator 1300 determines a number of integer bits required by an input. For example, the DPE configuration optimizer 1304 can determine that an input value to the accumulator 604 requires 17 integer bits and a configuration of the accumulator 604 enables the accumulator 604 to process 16 integer bits.

At block 1804, the example CNN accelerator 1300 determines whether a number of integer bits required are greater than a current number of integer bits. For example, the DPE configuration optimizer 1304 can determine that the input value of 17 integer bits requires more integer bits than the 16 integer bits of the configuration of the accumulator 604.

If, at block 1804, the example CNN accelerator 1300 determines that the number of integer bits required is greater than the current number of integer bits, control proceeds to block 1810 to convert the FP16 to fixed-point format. If, at block 1804, the example CNN accelerator 1300 determines that the number of integer bits required is less than the current number of integer bits, then, at block 1806, the CNN accelerator 1300 adjusts the fixed-point format by increasing a number of integer bits to the required number and decrease number of fractional bits accordingly. For example, the DPE configuration optimizer 1304 can increase the number of integer bits from 16 integer bits to 17 integer bits to increase the range of the accumulator 604 and decrease the number of fractional bits to decrease the precision of the accumulator 604.

In response to adjusting the fixed-point format, the example CNN accelerator 1300 aligns the accumulator to the updated fixed-point format at block 1808. For examples, the DPE configuration optimizer 1304 can align the accumulator 604 to the updated fixed-point format of 17 integer bits in this example. In response to aligning the accumulator at block 1808, the example CNN accelerator 1300 converts the FP16 input to fixed-point format at block 1810. For example, the convolution engine 1308, the pooling engine 1310, the fully connected engine 1312, etc., can convert an input to the accumulator 604 from FP16 to fixed-point format.

At block 1812, the example CNN accelerator adds the input to the accumulated value. For example, the convolution engine 1308, the pooling engine 1310, the fully connected engine 1312, etc., can add an input value to the accumulator 604 to a previously stored value or a previously accumulated value.

In response to adding the input to the accumulated value, the example CNN accelerator 1300 determines whether there is addition overflow. For example, the DPE configuration optimizer 1304 can determine that the number of integer bits of the accumulator 604 is not enough to prevent an overflow.

If, at block 1814, the example CNN accelerator 1300 determines that there is addition overflow, control proceeds to block 1822 to adjust the fixed-point format of the accumulator by 1 and decrease the fractional bits by 1. If, at block 1814, the example CNN accelerator 1300 determines that there is no addition overflow, then, at block 1816, the CNN accelerator 1300 determines whether the addition result is using a full range of integer bits. For example, the DPE configuration optimizer 1304 can decrease the number of integer bits by 1 to reduce the range, which is not needed due to the full range of integer bits not being used, and increase the precision to optimize and/or otherwise improve an operation of the accumulator 604 of FIG. 6.

If, at block 1816, the example CNN accelerator 1300 determines that the addition result is using the full range of integer bits, control proceeds to block 1824 to align the addition result to fixed-point format and assign to the accumulator. For example, the DPE configuration optimizer 1304 can determine that the accumulator 604 is optimized based on the addition result using the full range of integer bits of the accumulator 604.

If, at block 1816, the example CNN accelerator 1300 determines that the addition result is not using the full range of integer bits, then, at block 1818, the CNN accelerator 1300 determines whether the number of integer bits is greater than 12. For example, the DPE configuration optimizer 1304 determines whether the number of integer bits of the accumulator 604 is above a minimum threshold value of 12 integer bits and, if not, to increase the number of integer bits to a value at least equal to the minimum threshold value. Alternatively, the minimum threshold value may be any other number of integer bits.

If, at block 1818, the example CNN accelerator 1300 determines that the number of integer bits is not greater than 12, control proceeds to block 1822 to adjust the fixed-point format of the accumulator by increasing the number of integer bits by 1 and decreasing the fractional bits by 1. For example, the DPE configuration optimizer 1304 can increase the range of the accumulator 604 by increasing the number of integer bits, but decrease the precision of the accumulator 604 by decreasing the number of fractional bits. In response to adjusting the fixed-point format, control proceeds to block 1824 to align the addition result to the fixed-point format and assign to the accumulator.

If, at block 1818, the example CNN accelerator 1300 determines that the number of integer bits is greater than 12, then, at block 1820, the CNN accelerator 1300 adjusts the fixed-point format by decreasing the number of integer bits by 1 and increasing the fractional bits by 1. For example, the DPE configuration optimizer 1304 can decrease the range of the accumulator 604 by decreasing the number of integer bits, but increase the precision of the accumulator 604 by increasing the number of fractional bits.

In response to adjusting the fixed-point format at block 1820, control proceeds to block 1824 to align the addition result to the fixed-point format and assign to the accumulator. For example, the DPE configuration optimizer 1304 can align the addition result to an updated fixed-point format and assign the updated fixed-point format to the accumulator 604. In response to aligning the addition result to fixed-point format and assigning to the accumulator, the example machine readable instructions 1800 of FIG. 18 conclude.

Figure 19:
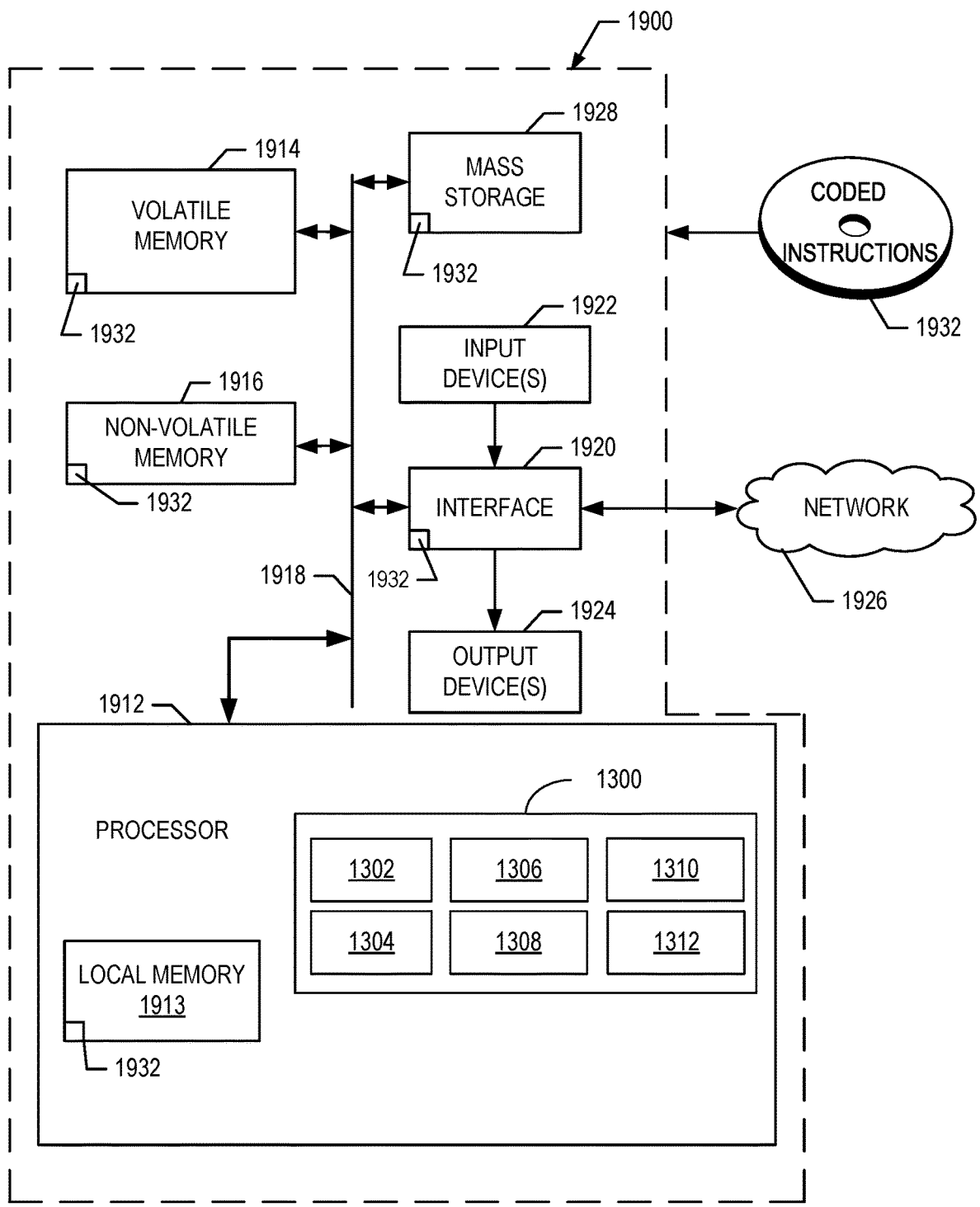
FIG. 19 is a block diagram of an example processor platform structured to execute the example machine readable instructions of FIGS. 14-18 to implement the example CNN accelerator of FIG. 13.

FIG. 19 is a block diagram of an example processor platform 1900 structured to execute the instructions of FIGS. 14-18 to implement the CNN accelerator 1300 of FIG. 13. The processor platform 1900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1912 implements the example CNN accelerator 1300, the example DPE inventory engine 1302, the example DPE configuration optimizer 1304, the example mode selector 1306, the example convolution engine 1308, the example pooling engine 1310, and the example fully connected engine 1312 of FIG. 13.

The processor 1912 of the illustrated example includes a local memory 1913 (e.g., a cache). The processor 1912 of the illustrated example is in communication with a main memory including a volatile memory 1914 and a non-volatile memory 1916 via a bus 1918. The volatile memory 1914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), a Bluetooth® interface, a near field communication (NFC) interface, and/or a PCI express interface.

In the illustrated example, one or more input devices 1922 are connected to the interface circuit 1920. The input device(s) 1922 permit(s) a user to enter data and/or commands into the processor 1912. The input device(s) 1922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 1920 of the illustrated example, thus, typically includes a graphics driver card, a graphics driver chip, and/or a graphics driver processor.

The interface circuit 1920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, redundant array of independent disks (RAID) systems, and digital versatile disk (DVD) drives.

The machine executable instructions 1932 of FIGS. 14-18 may be stored in the mass storage device 1928, in the volatile memory 1914, in the non-volatile memory 1916, and/or on a removable non-transitory computer readable storage medium such as a CD or DVD.

From the foregoing, it will be appreciated that example systems, methods, apparatus, and articles of manufacture have been disclosed that improve convolution efficiency of convolution neural networks. Examples disclosed herein accelerate convolution operations by convolving a plurality of input channels with a plurality of filters to generate a plurality of output locations of output channels substantially in parallel and/or otherwise substantially simultaneously. Examples disclosed herein provide enhanced convolution efficiencies by configuring storage instances for input image data and filter coefficients based on at least one of a mode of operation or a convolution arrangement. Examples disclosed herein provide improved convolution operations at reduced power by minimizing and/or reducing data movements within a CNN accelerator by accessing input locations of input channels only once during a convolution operation.

Example 1 includes an apparatus to improve convolution efficiency, the apparatus comprising a data processing element (DPE) inventory engine to identify DPEs included in a DPE array available to a platform, a mode selector to determine a convolution arrangement of identified ones of the DPEs, a DPE configuration optimizer to determine a DPE utilization based on the identified ones of the DPEs, and a convolution engine to facilitate a convolution operation using the identified ones of the DPEs when the DPE utilization satisfies a DPE utilization threshold.

Example 2 includes the apparatus of example 1, wherein the convolution engine is to multiply (a) activation values of an input location of an input channel and (b) filter coefficients corresponding to the input location to generate convolution outputs, and calculate a sum of the convolution outputs to generate an output location of an output channel.

Example 3 includes the apparatus of example 2, wherein the output location is a first output location, and the convolution engine is to calculate a pool area including output locations including the first output location, and calculate at least one of an average value or a maximum value of the pool area.

Example 4 includes the apparatus of example 3, wherein the convolution engine is to perform at least one of a bias operation, a scale operation, a parametric rectifier linear unit operation, or a rectifier linear unit operation on the at least one average value or maximum value of the pool area.

Example 5 includes the apparatus of example 1, wherein the convolution arrangement is a first convolution arrangement and the DPE utilization is a first DPE utilization, and the DPE configuration optimizer is to compare the first DPE utilization to the DPE utilization threshold, prevent the facilitation of the convolution operation when the first DPE utilization does not satisfy the DPE utilization threshold, compare a second DPE utilization associated with a second convolution arrangement to the DPE utilization threshold, and the convolution engine to facilitate the convolution operation using the second convolution arrangement when the second DPE utilization satisfies the DPE utilization threshold based on the comparison.

Example 6 includes the apparatus of example 1, wherein the DPE array includes 256 DPEs.

Example 7 includes the apparatus of example 1, wherein the convolution arrangement is at least one of 1*256, 2*128, 4*64, 8*32, or a 16*16 convolution arrangement.

Example 8 includes the apparatus of example 1, wherein the convolution engine facilitates the convolution operation using the identified ones of the DPEs substantially in parallel.

Example 9 includes the apparatus of example 1, wherein the convolution engine facilitates the convolution operation by at least one of adjusting a number of integer bits of an accumulator to modify a range of the accumulator or adjusting a number of fractional bits of the accumulator to modify a precision of the accumulator.

Example 10 includes a non-transitory computer readable storage medium comprising instructions which, when executed, cause a machine to at least identify data process elements (DPEs) included in a DPE array available to a platform, determine a convolution arrangement of identified ones of the DPEs, determine a DPE utilization based on the identified ones of the DPEs, and facilitate a convolution operation using the identified ones of the DPEs when the DPE utilization satisfies a DPE utilization threshold.

Example 11 includes the non-transitory computer readable storage medium of example 10, further including instructions which, when executed, cause the machine to at least multiply (a) activation values of an input location of an input channel and (b) filter coefficients corresponding to the input location to generate convolution outputs, and calculate a sum of the convolution outputs to generate an output location of an output channel.

Example 12 includes the non-transitory computer readable storage medium of example 11, wherein the output location is a first output location, and further including instructions which, when executed, cause the machine to at least calculate a pool area including output locations including the first output location, and calculate at least one of an average value or a maximum value of the pool area.

Example 13 includes the non-transitory computer readable storage medium of example 11, further including instructions which, when executed, cause the machine to at least perform at least one of a bias operation, a scale operation, a parametric rectifier linear unit operation, or a rectifier linear unit operation on the at least one average value or maximum value of the pool area.

Example 14 includes the non-transitory computer readable storage medium of example 10, wherein the convolution arrangement is a first convolution arrangement and the DPE utilization is a first DPE utilization, and further including instructions which, when executed, cause the machine to at least compare the first DPE utilization to the DPE utilization threshold, prevent the facilitation of the convolution operation when the first DPE utilization does not satisfy the DPE utilization threshold, compare a second DPE utilization associated with a second convolution arrangement to the DPE utilization threshold, and facilitate the convolution operation using the second convolution arrangement when the second DPE utilization satisfies the DPE utilization threshold based on the comparison.

Example 15 includes the non-transitory computer readable storage medium of example 10, wherein the DPE array includes 256 DPEs.

Example 16 includes the non-transitory computer readable storage medium of example 10, wherein the convolution arrangement is at least one of 1*256, 2*128, 4*64, 8*32, or a 16*16 convolution arrangement.

Example 17 includes the non-transitory computer readable storage medium of example 10, wherein the identified ones of the DPEs facilitate the convolution substantially in parallel.

Example 18 includes the non-transitory computer readable storage medium of example 10, further including instructions which, when executed, cause the machine to at least adjust a number of integer bits of an accumulator to modify a range of the accumulator or adjust a number of fractional bits of the accumulator to modify a precision of the accumulator.

Example 19 includes a method to improve convolution efficiency, the method comprising identifying data process elements (DPEs) included in a DPE array available to a platform, determining a convolution arrangement of identified ones of the DPEs, determining a DPE utilization based on the identified ones of the DPEs, and facilitating a convolution operation using the identified ones of the DPEs when the DPE utilization satisfies a DPE utilization threshold.

Example 20 includes the method of example 19, further including multiplying (a) activation values of an input location of an input channel and (b) filter coefficients corresponding to the input location to generate convolution outputs, and calculating a sum of the convolution outputs to generate an output location of an output channel.

Example 21 includes the method of example 20, wherein the output location is a first output location, further including calculating a pool area including output locations including the first output location, and calculating at least one of an average value or a maximum value of the pool area.

Example 22 includes the method of example 21, further including performing at least one of a bias operation, a scale operation, a parametric rectifier linear unit operation, or a rectifier linear unit operation on the at least one average value or maximum value of the pool area.

Example 23 includes the method of example 19, wherein the convolution arrangement is a first convolution arrangement and the DPE utilization is a first DPE utilization, and further including comparing the first DPE utilization to the DPE utilization threshold, preventing the facilitation of the convolution operation when the first DPE utilization does not satisfy the DPE utilization threshold, comparing a second DPE utilization associated with a second convolution arrangement to the DPE utilization threshold, and facilitating the convolution operation using the second convolution arrangement when the second DPE utilization satisfies the DPE utilization threshold based on the comparison.

Example 24 includes the method of example 19, wherein the DPE array includes 256 DPEs.

Example 25 includes the method of example 19, wherein the convolution arrangement is at least one of 1*256, 2*128, 4*64, 8*32, or a 16*16 convolution arrangement.

Example 26 includes the method of example 19, wherein the identified ones of the DPEs facilitate the convolution substantially in parallel.

Example 27 includes the method of example 19, wherein facilitating the convolution operation includes at least one of adjusting a number of integer bits of an accumulator to modify a range of the accumulator or adjusting a number of fractional bits of the accumulator to modify a precision of the accumulator.

Example 28 includes an apparatus to improve convolution efficiency, the apparatus comprising a first means to identify DPEs included in a DPE array available to a platform, a second means to determine a convolution arrangement of identified ones of the DPEs, a third means to determine a DPE utilization based on the identified ones of the DPEs, and a fourth means to facilitate a convolution operation using the identified ones of the DPEs when the DPE utilization satisfies a DPE utilization threshold.

Example 29 includes the apparatus of example 28, wherein the fourth means is to multiply (a) activation values of an input location of an input channel and (b) filter coefficients corresponding to the input location to generate convolution outputs, and calculate a sum of the convolution outputs to generate an output location of an output channel.

Example 30 includes the apparatus of example 29, wherein the output location is a first output location, and the fourth means is to calculate a pool area including output locations including the first output location, and calculate at least one of an average value or a maximum value of the pool area.

Example 31 includes the apparatus of example 30, wherein the fourth means is to perform at least one of a bias operation, a scale operation, a parametric rectifier linear unit operation, or a rectifier linear unit operation on the at least one average value or maximum value of the pool area.

Example 32 includes the apparatus of example 28, wherein the convolution arrangement is a first convolution arrangement and the DPE utilization is a first DPE utilization, and the third means is to compare the first DPE utilization to the DPE utilization threshold, prevent the facilitation of the convolution operation when the first DPE utilization does not satisfy the DPE utilization threshold, compare a second DPE utilization associated with a second convolution arrangement to the DPE utilization threshold, and the fourth means is to facilitate the convolution operation using the second convolution arrangement when the second DPE utilization satisfies the DPE utilization threshold based on the comparison.

Example 33 includes the apparatus of example 28, wherein the DPE array includes 256 DPEs.

Example 34 includes the apparatus of example 28, wherein the convolution arrangement is at least one of 1*256, 2*128, 4*64, 8*32, or a 16*16 convolution arrangement.

Example 35 includes the apparatus of example 28, wherein the fourth means facilitates the convolution operation using the identified ones of the DPEs substantially in parallel.

Example 36 includes the apparatus of example 28, wherein the fourth means facilitates the convolution operation by at least one of adjusting a number of integer bits of an accumulator to modify a range of the accumulator or adjusting a number of fractional bits of the accumulator to modify a precision of the accumulator.

Examples disclosed herein may apply to internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) term specified in service level and service delivery agreements.

Backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/deMUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices, such as over the backbone links, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources.

Clusters of IoT devices may be equipped to communicate with other IoT devices as well as with a cloud network. This may allow the IoT devices to form an ad-hoc network between the devices, allowing them to function as a single device, which may be termed a fog device.

A cloud computing network in communication with a mesh network of IoT devices may operate as a fog device at the edge of the cloud computing network. The mesh network of IoT devices may be termed a fog, operating at the edge of the cloud.

The fog may be considered to be a massively interconnected network wherein a number of IoT devices are in communications with each other, for example, by radio links. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices include gateways, data aggregators, and sensors, although any combinations of IoT devices and functionality may be used. The gateways may be edge devices that provide communications between the cloud and the fog, and may also provide the backend process function for data obtained from sensors, such as motion data, flow data, temperature data, and the like. The data aggregators may collect data from any number of the sensors, and perform the back end processing function for the analysis. The results, raw data, or both may be passed along to the cloud through the gateways. The sensors may be full IoT devices, for example, capable of both collecting data and processing the data. In some cases, the sensors may be more limited in functionality, for example, collecting the data and allowing the data aggregators or gateways to process the data.

Communications from any IoT device may be passed along a convenient path (e.g., a most convenient path) between any of the IoT devices to reach the gateways. In these networks, the number of interconnections provide substantial redundancy, allowing communications to be maintained, even with the loss of a number of IoT devices. Further, the use of a mesh network may allow IoT devices that are very low power or located at a distance from infrastructure to be used, as the range to connect to another IoT device may be much less than the range to connect to the gateways.

The fog provided from these IoT devices may be presented to devices in the cloud, such as a server, as a single device located at the edge of the cloud, e.g., a fog device. In this example, the alerts coming from the fog device may be sent without being identified as coming from a specific IoT device within the fog. In this fashion, the fog may be considered a distributed platform that provides computing and storage resources to perform processing or data-intensive tasks such as data analytics, data aggregation, and machine-learning, among others.

In some examples, the IoT devices may be configured using an imperative programming style, e.g., with each IoT device having a specific function and communication partners. However, the IoT devices forming the fog device may be configured in a declarative programming style, allowing the IoT devices to reconfigure their operations and communications, such as to determine needed resources in response to conditions, queries, and device failures. As an example, a query from a user located at a server about the operations of a subset of equipment monitored by the IoT devices may result in the fog device selecting the IoT devices, such as particular sensors, needed to answer the query. The data from these sensors may then be aggregated and analyzed by any combination of the sensors, data aggregators, or gateways, before being sent on by the fog device to the server to answer the query. In this example, IoT devices in the fog may select the sensors used based on the query, such as adding data from flow sensors or temperature sensors. Further, if some of the IoT devices are not operational, other IoT devices in the fog device may provide analogous data, if available.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A hardware accelerator comprising:
 a first hardware data path element (DPE) in a DPE array, the first hardware DPE including:
  an accumulator; and
  a multiplier coupled to the accumulator, the multiplier to multiply first inputs including an activation value and a filter coefficient value to generate a first convolution output when the first hardware DPE is in a convolution mode; and
 a controller coupled to the DPE array, the controller to:
  identify an arrangement of the DPE array based on the first inputs, the arrangement to include one or more hardware DPEs of the DPE array to receive the first inputs, the one or more hardware DPEs including the first hardware DPE; and
  in response to a determination that a count of unused ones of the hardware DPEs of the DPE array in the arrangement satisfies a threshold, adjust the first hardware DPE from the convolution mode to a pooling mode by causing the multiplier and the accumulator to generate a second convolution output based on second inputs, the second inputs including an output location value of a pool area, at least one of the first inputs different from at least one of the second inputs.

2. The hardware accelerator of claim 1, wherein the first hardware DPE includes:
 a data input interface coupled to the multiplier, the data input interface to transmit the activation value to the multiplier in response to detecting a first logic low signal corresponding to a first interface, the first interface different from the data input interface;
 a filter coefficient interface coupled to the multiplier, the filter coefficient interface to transmit the filter coefficient value to the multiplier in response to detecting a second logic low signal corresponding to an average pooling interface; and
 the multiplier to multiply the activation value and the filter coefficient value in response to detecting a logic high signal corresponding to an enable interface.

3. The hardware accelerator of claim 1, wherein the first hardware DPE includes:
 a flip-flop;
 a comparator coupled to the flip-flop, the comparator to:
  compare the second convolution output to the first convolution output in response to detecting a first logic high signal corresponding to a pool interface; and
  in response to determining that the second convolution output is greater than the first convolution output, invoke the flip-flop to generate a second logic high signal; and
 a register coupled to the comparator and the accumulator, the register to:
  store the first convolution output;
  in response to detecting the second logic high signal, store the second convolution output; and
  in response to detecting a third logic high signal corresponding to a maximum pooling interface, transmit the second convolution output to a data out interface.

4. The hardware accelerator of claim 1, wherein the output location value is a first output location value, and the first hardware DPE includes:
 a register to, in response to detecting a first logic high signal corresponding to a first interface, transmit a sum value of output location values to the multiplier, the output location values including the first output location value; and
 in response to detecting a second logic high signal corresponding to an average pooling interface, the multiplier to generate the second convolution output by multiplying the sum value and a pool size value.

5. The hardware accelerator of claim 1, further including a buffer coupled to the first hardware DPE, the accumulator to transmit the first convolution output to the buffer in response to detecting a logic low signal corresponding to a maximum pooling interface.

6. The hardware accelerator of claim 1, wherein the controller is to adjust (A) a first number of integer bits of the accumulator to modify a range of the accumulator, (B) a second number of fractional bits of the accumulator to modify a precision of the accumulator, or the first number of the integer bits and the second number of the fractional bits.

7. The hardware accelerator of claim 1, wherein the DPE array includes 256 instances of the first hardware DPE, and the arrangement is a configuration arrangement, the hardware accelerator further including:
 a coefficient store coupled to the controller and the DPE array; and
 a data store coupled to the controller, the controller to:
  configure the DPE array based on the configuration arrangement, the configuration arrangement being a 1*256, 2*128, 4*64, 8*32, or a 16*16 arrangement; and
  configure at least one of the coefficient store or the data store based on the configuration arrangement.

8. A hardware accelerator comprising:
 a first hardware data path element (DPE) in a DPE array, the first hardware DPE including:
  means for multiplying first inputs, the first inputs including an activation value and a filter coefficient value, the means for multiplying to generate a first convolution output when the first hardware DPE is in a convolution mode; and
  means for accumulating convolution outputs including the first convolution output; and
 a circuit for adjusting the DPE array, the circuit for adjusting to:
  identify an arrangement of the DPE array based on the first inputs, the arrangement to include one or more hardware DPEs of the DPE array to receive the first inputs, the one or more hardware DPEs including the first hardware DPE; and
  in response to a determination that a count of unutilized ones of the hardware DPEs of the DPE array in the arrangement satisfies a threshold, adjust the first hardware DPE from the convolution mode to a pooling mode by causing the hardware DPE to generate a second convolution output based on second inputs, the second inputs including an output location value of a pool area, at least one of the first inputs different from at least one of the second inputs.

9. The hardware accelerator of claim 8, wherein the first hardware DPE includes:
 means for data input interfacing to transmit the activation value to the means for multiplying in response to detecting a first logic low signal corresponding to a first interface, the first interface different from the means for data input interfacing; and
 means for filter coefficient interfacing to transmit the filter coefficient value to the means for multiplying in response to detecting a second logic low signal corresponding to an average pooling interface, the means for multiplying to multiply the activation value and the filter coefficient value in response to detecting a logic high signal corresponding to an enable interface.

10. The hardware accelerator of claim 8, wherein the first hardware DPE includes:
 a flip-flop;
 a circuit for comparing coupled to the flip-flop, the circuit for comparing to:
  compare the second convolution output to the first convolution output in response to detecting a first logic high signal corresponding to a pool interface; and
  in response to determining that the second convolution output is greater than the first convolution output, invoke the flip-flop to generate a second logic high signal; and
 means for storing coupled to the circuit for comparing and the means for accumulating, the means for storing to:
  store the first convolution output;
  in response to detecting the second logic high signal, store the second convolution output; and
  in response to detecting a third logic high signal corresponding to a maximum pooling interface, transmit the second convolution output to a data out interface.

11. The hardware accelerator of claim 8, wherein the output location value is a first output location value, and the first hardware DPE includes:
 means for storing to:
  store a sum value of output location values, the output location values including the first output location value; and
  in response to detecting a first logic high signal corresponding to a first interface, output the sum value to the means for multiplying; and
 in response to detecting a second logic high signal corresponding to an average pooling interface, the means for multiplying to generate the second convolution output by multiplying the sum value and a pool size value.

12. The hardware accelerator of claim 8, further including means for buffering coupled to the first hardware DPE, the means for accumulating to transmit the first convolution output to the means for buffering in response to detecting a logic low signal corresponding to a maximum pooling interface.

13. The hardware accelerator of claim 8, wherein the circuit for adjusting is to adjust (A) a first number of integer bits of the means for accumulating to modify a range of the means for accumulating, (B) a second number of fractional bits of the means for accumulating to modify a precision of the means for accumulating, or the first number of the integer bits and the second number of the fractional bits.

14. The hardware accelerator of claim 8, wherein the DPE array includes 256 instances of the first hardware DPE, and the arrangement is a configuration arrangement, the hardware accelerator further including:
 first means for storing coupled to the circuit for adjusting and the DPE array; and
 second means for storing coupled to the circuit for adjusting, the circuit for adjusting to:
  configure the DPE array based on the configuration arrangement, the configuration arrangement being a 1*256, 2*128, 4*64, 8*32, or a 16*16 arrangement; and
  configure at least one of the first means for storing or the second means for storing based on the configuration arrangement.

* * * * *